(12) United States Patent
Donatelli et al.

(10) Patent No.: US 12,553,467 B2
(45) Date of Patent: Feb. 17, 2026

(54) CLAMPING MECHANISM FOR A BALL MOUNT

(71) Applicant: APG VISION LLC, Allison Park, PA (US)

(72) Inventors: Gregory M. Donatelli, Hatboro, PA (US); Christopher C. McGeary, Gibsonia, PA (US); Tyler William Dulaney, Greenville, PA (US)

(73) Assignee: APG VISION LLC, Allison Park, PA (US)

( * ) Notice: Subject to any disclaimer, the term of this patent is extended or adjusted under 35 U.S.C. 154(b) by 839 days.

(21) Appl. No.: 17/837,212

(22) Filed: Jun. 10, 2022

(65) Prior Publication Data

US 2022/0403973 A1 Dec. 22, 2022

Related U.S. Application Data

(60) Provisional application No. 63/209,548, filed on Jun. 11, 2021.

(51) Int. Cl.
*F16C 11/06* (2006.01)
(52) U.S. Cl.
CPC .................................. *F16C 11/06* (2013.01)
(58) Field of Classification Search
None
See application file for complete search history.

(56) References Cited

U.S. PATENT DOCUMENTS

| 5,271,651 | A | * | 12/1993 | Blatt | B25B 5/006 269/71 |
| 5,393,161 | A | * | 2/1995 | Mata | A61B 17/6416 403/112 |
| 6,164,604 | A | * | 12/2000 | Cirino | F16L 3/04 248/74.3 |
| 6,386,786 | B1 | * | 5/2002 | Perlman | F16L 3/085 403/374.2 |
| 6,578,801 | B2 | * | 6/2003 | Attee | F16B 7/0433 269/282 |
| 8,201,785 | B2 | | 6/2012 | Goodman | |

(Continued)

FOREIGN PATENT DOCUMENTS

DE 20 2012 012 427 U1 1/2013
EP 1 675 244 B1 6/2006
(Continued)

*Primary Examiner* — Matthew R McMahon
(74) *Attorney, Agent, or Firm* — Foley & Lardner LLP

(57) ABSTRACT

A clamping mechanism configured to be attachable to a mounting base and to support a ball mount between the clamping mechanism and the mounting base. The clamping mechanism comprising a first-end portion configured to be attached to the mounting base, the first-end portion including a tab, a flexible section, a first bottom surface that extends in a first plane, and a first through hole extending through the tab and the first bottom surface; a second-end portion configured such that a bend allowance of the second-end portion is less than a bend allowance of the first-end portion, the second-end portion including a second bottom surface that extends in a second plane, and a second through hole extending through the second bottom surface; and a contoured surface configured to cradle a body portion of the ball mount.

10 Claims, 26 Drawing Sheets

(56) References Cited

U.S. PATENT DOCUMENTS

| | | | |
|---|---|---|---|
| 8,201,800 B2 | 6/2012 | Filipiak | |
| 8,419,309 B2 | 4/2013 | Wimberley | |
| 8,919,221 B2 | 12/2014 | Chiou | |
| 9,188,280 B2 | 11/2015 | Congdon | |
| 9,415,520 B2 | 8/2016 | Sanders et al. | |
| 9,458,951 B2 * | 10/2016 | Haynes | F16L 3/1222 |
| 9,777,757 B2 * | 10/2017 | Murata | F16B 2/065 |
| 10,178,209 B1 | 1/2019 | Hesse | |
| 10,337,664 B2 * | 7/2019 | Migliori | F16M 11/14 |
| 10,343,720 B2 * | 7/2019 | Savard | B62D 21/183 |
| 10,547,769 B2 | 1/2020 | Harrison | |
| 10,760,618 B2 * | 9/2020 | Cymbal | F16D 1/0864 |
| D904,169 S | 12/2020 | Nighswander et al. | |
| D904,862 S | 12/2020 | Nighswander et al. | |
| D904,912 S | 12/2020 | Nighswander et al. | |
| 11,293,589 B2 | 4/2022 | Nighswander et al. | |
| 2020/0316792 A1 | 10/2020 | Nighswander et al. | |
| 2020/0362895 A1 * | 11/2020 | Lin | F16B 9/02 |

FOREIGN PATENT DOCUMENTS

| | | | |
|---|---|---|---|
| EP | 2 369 211 A2 | 9/2011 | |
| EP | 2 492 566 A2 | 8/2012 | |

* cited by examiner

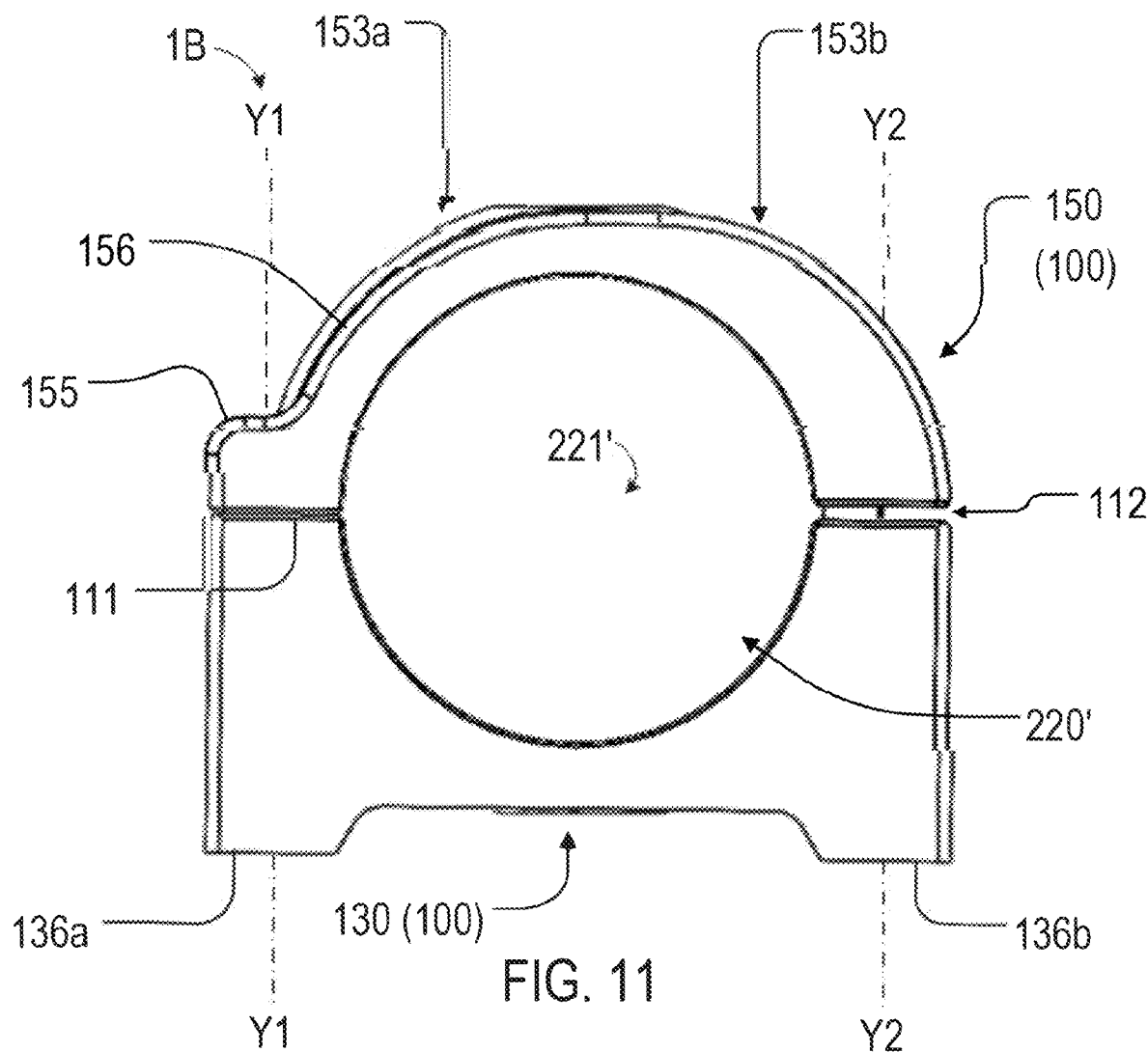

CLAMPING MECHANISM FOR A BALL MOUNT

BACKGROUND

The benefit of and priority to U.S. Provisional Application No. 63/209,548, filed Jun. 11, 2021 is hereby claimed. The entire contents of this provisional application are incorporated herein by reference.

Ball mounts may be adjustably attached to, and supported by, conventional mounts, brackets, clamps, or like mechanisms. A wide variety of adjustable mounts, brackets, and clamps for ball mounts are available, which are configured to enable a ball mount to be moved into various positions relative to the mount, bracket, or clamp supporting the ball mount and to secure the ball mount at a given position relative to the mount, bracket, or clamp.

SUMMARY

In certain applications, ball mounts may be required to be attached to or integrated with equipment, such as cameras, lighting, sensors, and machine vision equipment, which may increase the rotational force of the ball mount relative to a mount, bracket, or clamp supporting the ball mount due to the external load of such equipment. These mounts, brackets, or clamps may be required to enable the ball mount to be moved into various positions and secured in an exact position in order to hold electronic equipment in a steady position to obtain clear images, readings, or accurate measurements. However, in such applications, the ball mount may be required to bear a load which may cause the ball mount to pivot or slip relative to the mount, bracket, or clamp supporting the ball mount. Alternatively, the external loads may cause the mount, bracket, or clamp configured to support the ball mount to yield and fail.

The present disclosure relates to a highly-reliable clamping mechanism for a ball mount configured to provide a strong clamping force to the ball mount and to secure the ball mount in an exact position without increasing material costs and without compromising the adjustability of the ball mount relative to the clamping mechanism. The clamping mechanism disclosed herein includes a first-end portion having a flexible section, the flexible section having a bend allowance greater than a bend allowance of a second-end portion of the clamping mechanism thereby enabling the clamping mechanism to be bent and clamped in a fixed position when the clamping mechanism is fastened to a mounting base configured to support the ball mount. In certain embodiments, the first-end portion at the flexible section is thinner than the second-end portion.

At least one embodiment relates to a clamping mechanism configured to be attachable to a mounting base and to support a ball mount between the clamping mechanism and the mounting base, the clamping mechanism comprising a first-end portion configured to be attached to the mounting base, the first-end portion including a tab, a flexible section, a first bottom surface that extends in a first plane, and a first through hole extending through the tab and the first bottom surface; a second-end portion configured such that a bend allowance of the second-end portion is less than a bend allowance of the first-end portion, the second-end portion including a second bottom surface that extends in a second plane, and a second through hole extending through the second bottom surface; and a contoured surface configured to cradle a body portion of the ball mount.

Another embodiment relates to a clamping mechanism configured to be attachable to a mounting base and to support a ball mount between the clamping mechanism and the mounting base, the clamping mechanism comprising a first-end portion configured to be attached to the mounting base, the first-end portion including a tab, a flexible section, a first bottom surface that extends in a first plane, and a first through hole extending through the tab and the first bottom surface; a second-end portion having a radial cross-sectional area that is greater than a radial cross-sectional area of the flexible section, the second-end portion including a second bottom surface that extends in a second plane, and a second through hole extending through the second bottom surface; and a contoured surface configured to cradle a body portion of the ball mount, wherein the first plane is substantially parallel to, and offset from, the second plane.

Yet another embodiment relates to a method for adjustably clamping a ball mount to a mounting base, the method comprising providing a mounting base comprising a mounting base contoured surface, a first surface having a first mounting base hole, and a second surface having a second mounting base hole; providing a clamping mechanism comprising a first-end portion including a tab, a flexible section, a first bottom surface that extends in a first plane, and a first through hole extending through the first bottom surface, a second-end portion including a second bottom surface that extends in a second plane, a second through hole extending through the second bottom surface, and a contoured surface configured to cradle a body portion of the ball mount, providing the ball mount between the contoured surface of the clamping mechanism and the mounting base contoured surface such that the first through hole and the second through hole of the clamping mechanism align with the first mounting base hole and the second mounting base hole respectively; and securing the ball mount between the clamping mechanism and the mounting base such that the first surface of the mounting base contacts the first bottom surface of the clamping mechanism, and the second surface of the mounting base is separated from the second bottom surface of the clamping mechanism by a gap.

Yet another embodiment relates to a clamping mechanism configured to be attachable to a mounting base and to support a ball mount between the clamping mechanism and the mounting base, the clamping mechanism comprising a first-end portion configured to be attached to the mounting base, the first-end portion including a flexible section, a first bottom surface that extends in a first plane, and a first through hole extending through the first bottom surface; a second-end portion configured such that a bend allowance of the second-end portion is less than a bend allowance of the first-end portion, the second-end portion including a second bottom surface that extends in a second plane, and a second through hole extending through the second bottom surface; and a contoured surface configured to cradle a body portion of the ball mount.

Yet another embodiment relates to a clamping mechanism configured to be attachable to a mounting base and to support a ball mount between the clamping mechanism and the mounting base, the clamping mechanism comprising a first-end portion configured to be attached to the mounting base, the first-end portion including a flexible section, a first bottom surface that extends in a first plane, and a first through hole extending through the first bottom surface; a second-end portion having a radial cross-sectional area that is greater than a radial cross-sectional area of the flexible section, the second-end portion including a second bottom surface that extends in a second plane, and a second through hole extending through the second bottom surface; and a contoured surface configured to cradle a body portion of the ball mount, wherein the first plane is substantially parallel to, and offset from, the second plane.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals, symbols, or terms generally identify similar elements, unless context dictates otherwise, and in which:

FIG. 11 is a front view of the mounted ball mount assembly shown in FIG. 10A.

DETAILED DESCRIPTION

Before turning to the figures, which illustrate certain exemplary embodiments in detail, it should be understood that the present disclosure is not limited to the details or methodology set forth in the description or illustrated in the figures.

Referring generally to the figures, disclosed herein is a bracket assembly including a mounting base and a clamping mechanism. The clamping mechanism is configured to adjustably support and/or mount a ball mount to a base mount. The ball mount may have a sealing device integrated therein and may be directly connected to and/or integrated with a device, apparatus, enclosure, or mount. Various aspects of the clamping mechanism, and methods described herein, achieve technical advantages including, but not limited to, those noted herein. For ease of reference, embodiments in the present disclosure are described with respect to a mounted enclosure system having a clamping mechanism configured to be attachable to a mounting base and to adjustably support a ball mount assembly that is attachable to an enclosure; however, it is to be understood that the clamping mechanism and methods described herein apply to, and can be used, for other applications.

Figure 9A:
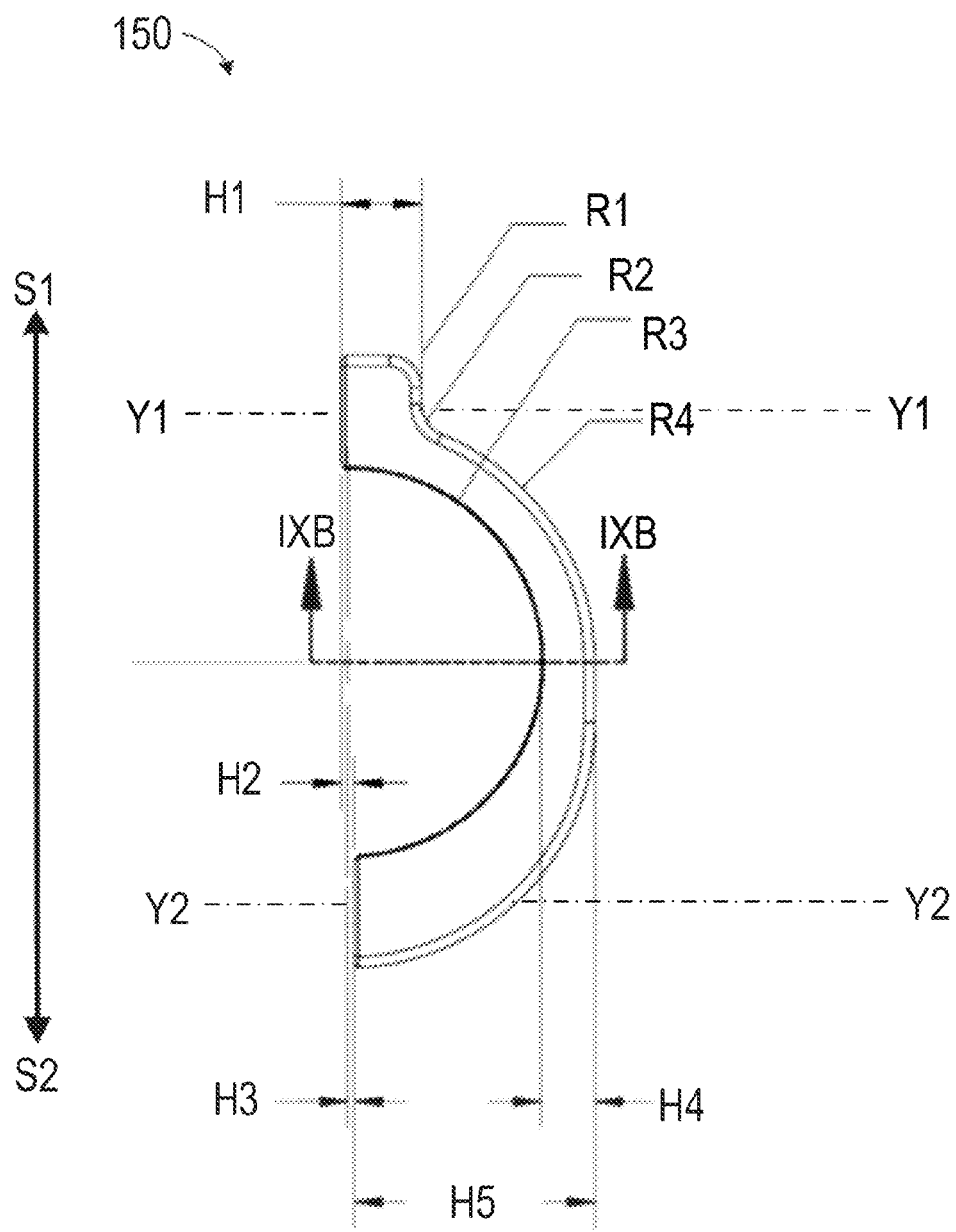
FIG. 9A is a front view of the clamping mechanism shown in FIG. 8A.

As utilized herein, the first-end side direction is a direction relative to the clamping mechanism in a length direction extending in the direction of the clamping mechanism having a first-end portion 153a (for example, an upward direction (S1) in FIG. 9A), and the second-end side direction is a direction relative to the clamping mechanism having a second-end portion 153b and oriented opposite to the first-end side direction (for example, a downward direction (S2) in FIG. 9A). According to one embodiment, the first-end side direction extends approximately through a first through hole axis of the clamping mechanism, and the second-end side direction extends approximately through a second through hole axis of the clamping mechanism.

Overview of Mounted Enclosure System

Figure 1A:
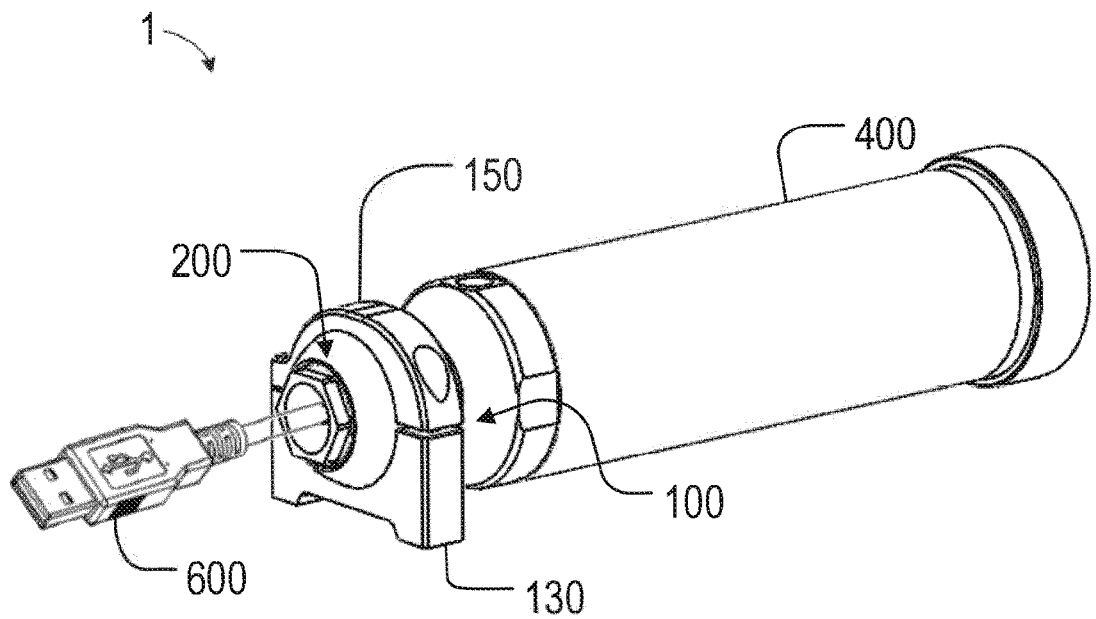
FIG. 1A is a front perspective view of a mounted enclosure system, according to an exemplary embodiment.
Figure 1B:
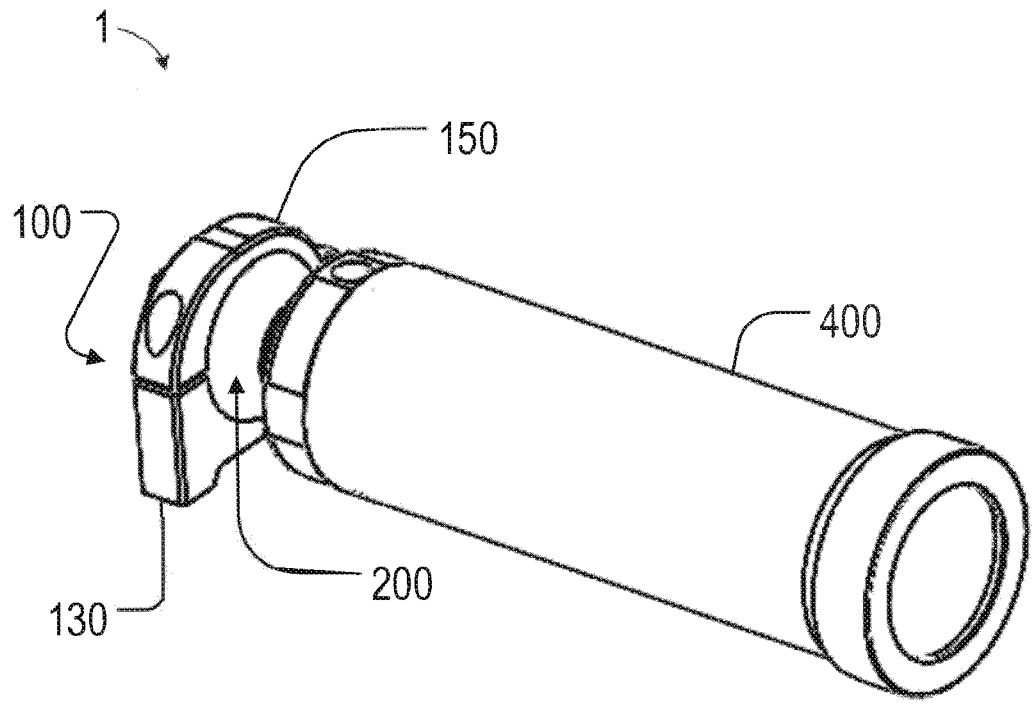
FIG. 1B is a rear perspective view of the mounted enclosure system shown in FIG. 1A.

FIG. 1A is a front perspective view of a mounted enclosure system 1, according to one exemplary embodiment. FIG. 1B is a rear perspective view of the mounted enclosure system 1 shown in FIG. 1A.

FIGS. 1A-1B show an exemplary embodiment of a mounted enclosure system 1 designed to provide maximum protection to electrical systems contained therein from harsh industrial environments without compromising the adjustability of the electrical system. The mounted enclosure system 1 may include a ball mount assembly 200 having a sealing device, such as a soft rubber, foam, or like device integrated therein, an enclosure 400, and a bracket assembly 100. The bracket assembly 100 may include a mounting base 130 and a clamping mechanism 150. The enclosure 400 and the ball mount assembly 200 may be designed in a variety of different shapes and configurations, and it is to be understood that the present disclosure is not limited to the exemplary embodiments depicted in FIGS. 1A and 1B.

According to one embodiment, the mounted enclosure system 1 shown in FIGS. 1A-1B may be designed to allow a cable 600, tube, and/or the like to pass therethrough. The cable 600 may be configured to provide an electrical signal and/or a fluid flow through the ball mount assembly 200 and the bracket assembly 100. The bracket assembly 100 may be designed to clamp the ball mount assembly 200 by bending the clamping mechanism 150 toward the ball mount assembly 200 as the clamping mechanism 150 is attached to the mounting base 130 to support the ball mount assembly 200 in a fixed position. The ball mount assembly 200 may be configured to form a leak resistant connection with the enclosure 400 and may be supported by the bracket assembly 100. The ball mount assembly 200 may also form a pressure seal between the exterior of the ball mount assembly 200 and the interior of the enclosure 400. The enclosure 400 may be designed to accommodate electrical devices such as cameras, lighting, sensors, barcode readers, lasers, machine vision equipment, security equipment, and the like.

According to one embodiment, the clamping mechanism 150 may be fastened/attached to the mounting base 130 such that the ball mount assembly 200 may be securely fixed relative to the clamping mechanism 150 and/or the mounting base 130. In such a fixed configuration (or fully fastened state), at least one side of the clamping mechanism 150 may be configured to bend toward the mounting base 130 and/or the ball mount assembly 200. The clamping mechanism 150 may be fastened/attached to the mounting base 130 by fasteners such that at least one side of the clamping mechanism 150 may be attached, loosened, and/or adjusted so that the ball mount assembly 200 may be adjusted relative to the clamping mechanism 150 and/or the mounting base 130.

In at least one of the above mentioned configurations, the clamping mechanism 150 may be attached to the mounting base 130 such that an angle position of the ball mount assembly 200, and the enclosure 400 attachable thereto, may be adjusted relative to the clamping mechanism 150 and/or the mounting base 130. Various embodiments of the structure of the bracket assembly 100 and the ball mount assembly 200, and the components thereof, are described in more detail below.

Overview of Mounted Ball Mount Assembly

Figure 2A:
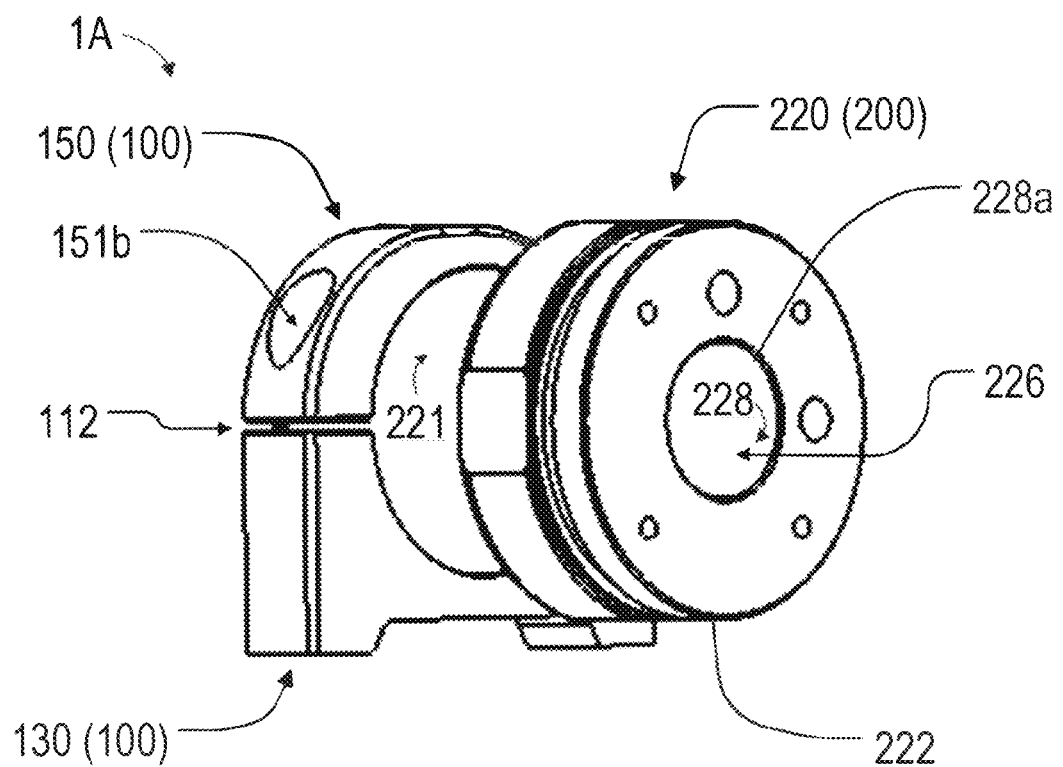
FIG. 2A is a left-side rear perspective view of a mounted ball mount assembly, according to an exemplary embodiment.
Figure 2B:
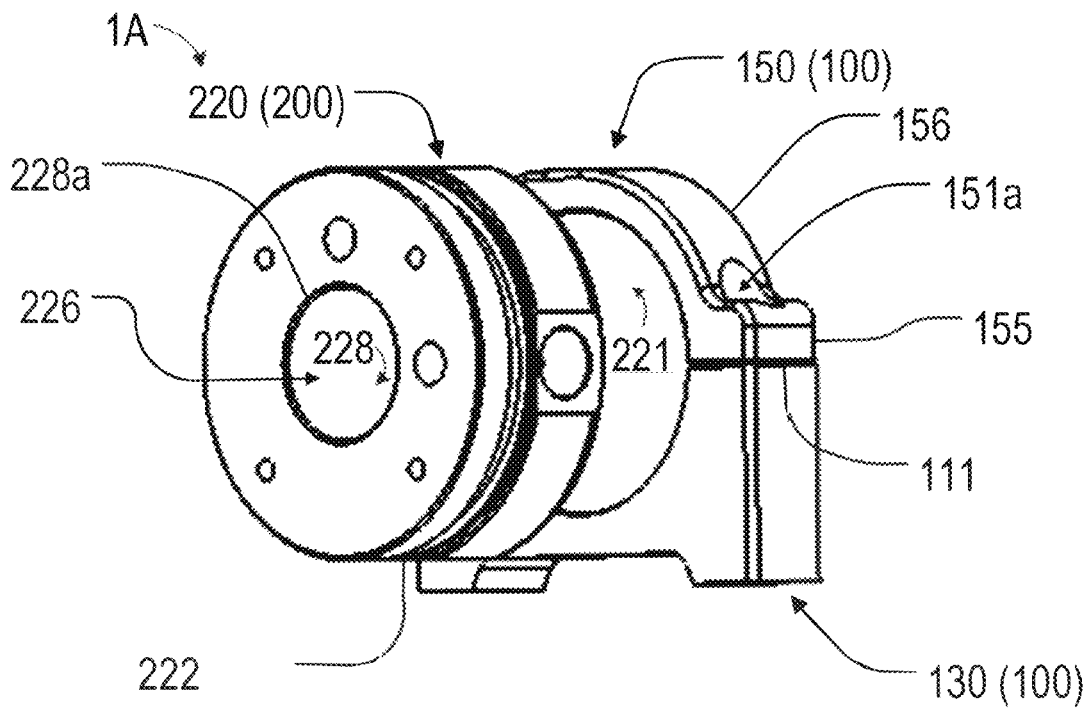
FIG. 2B is a right-side rear perspective view of the mounted ball mount assembly shown in FIG. 2A.
Figure 3:
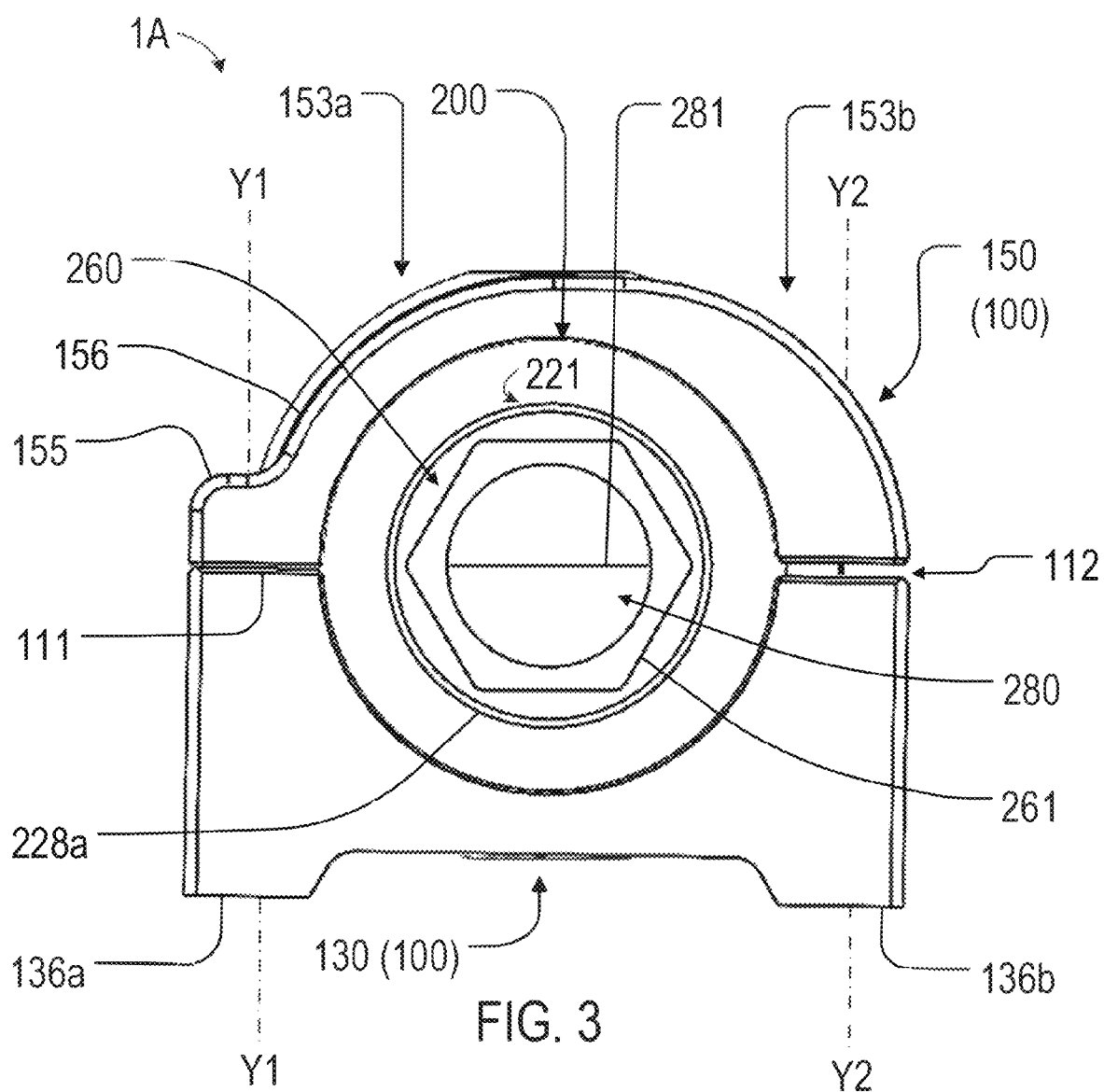
FIG. 3 is a front view of the mounted ball mount assembly shown in FIG. 2A.
Figure 4:
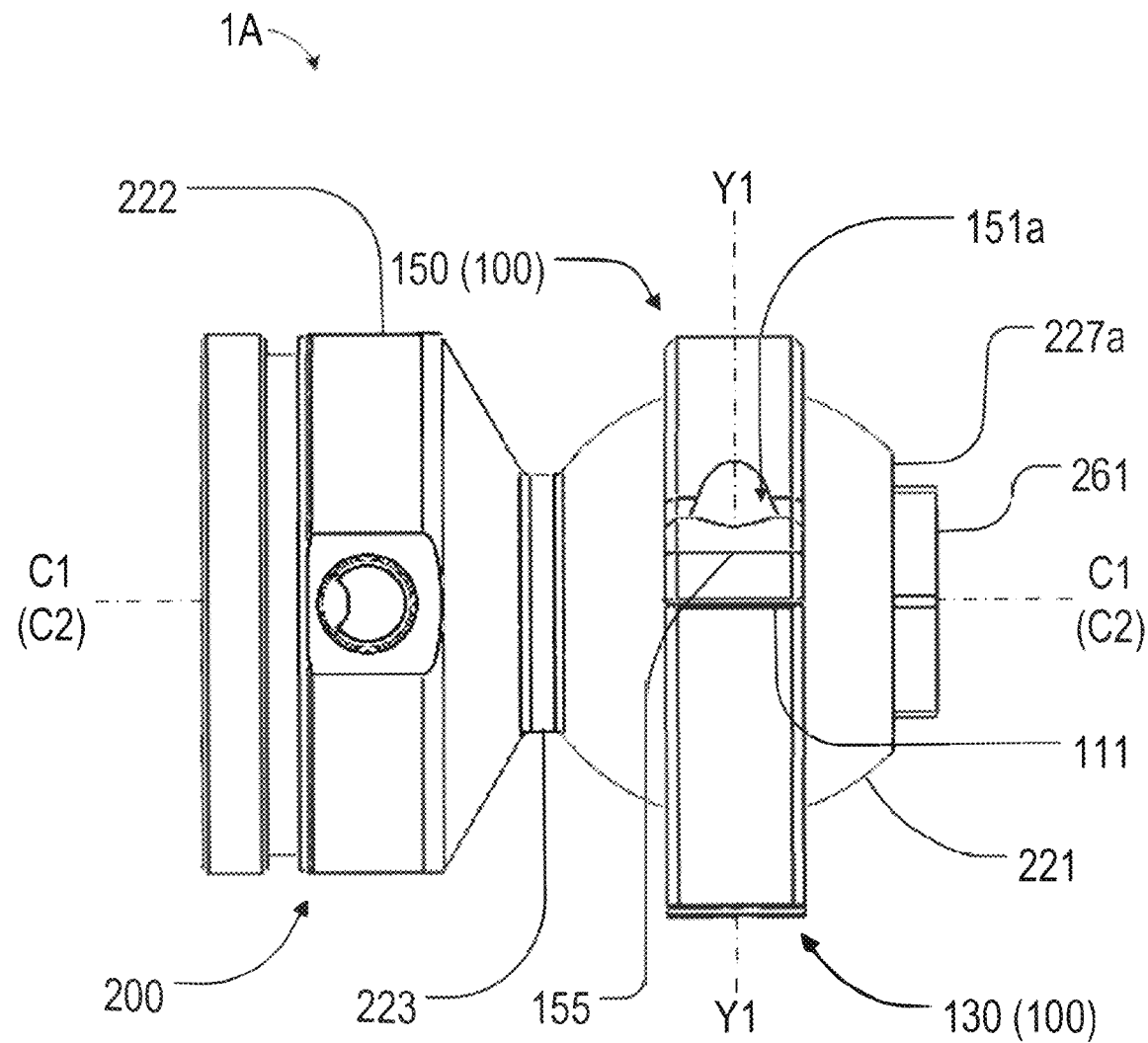
FIG. 4 is a side view of the mounted ball mount assembly shown in FIG. 2A.
Figure 5:
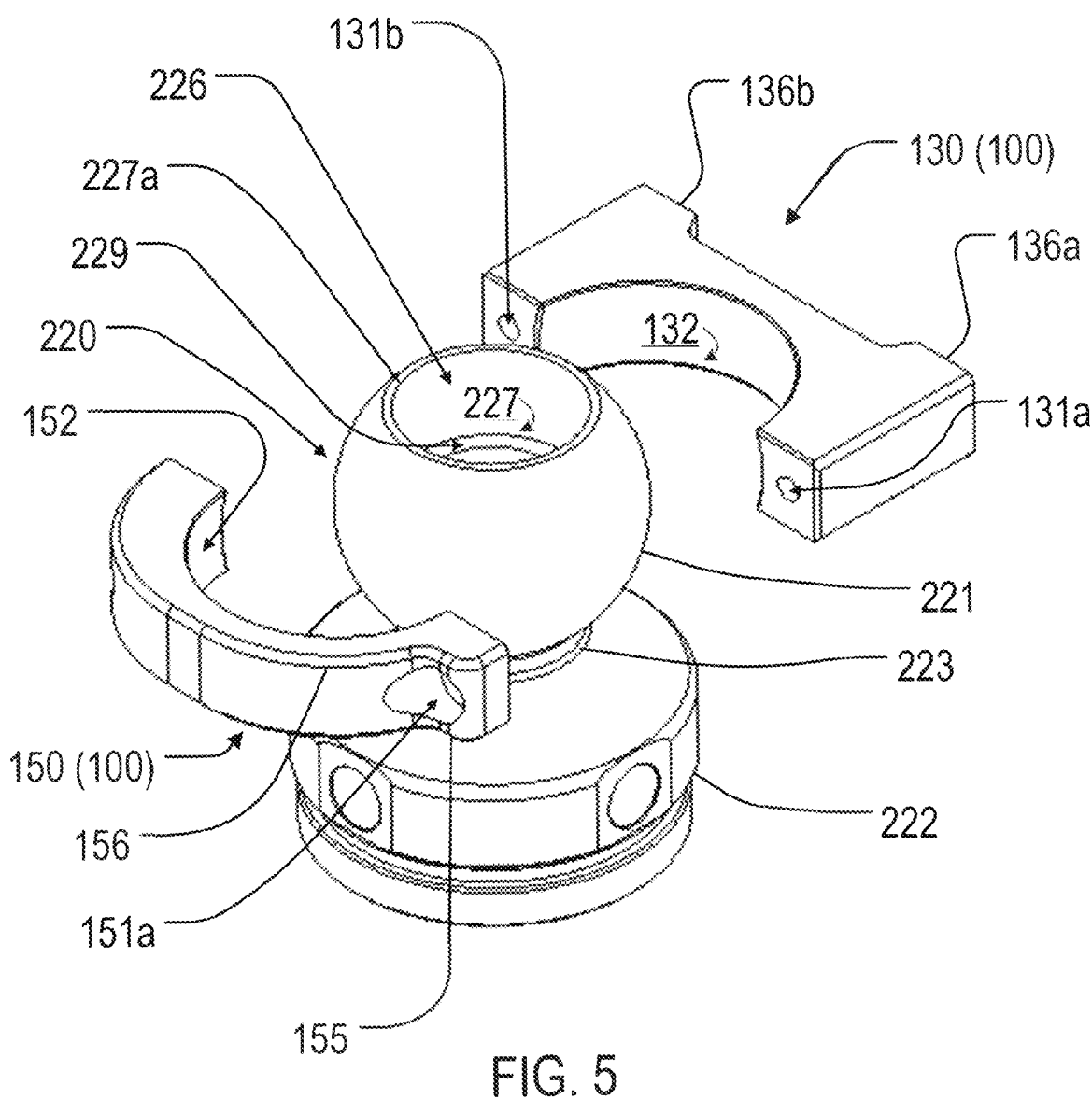
FIG. 5 is an exploded view of a ball mount and a bracket assembly, according to the embodiment shown in FIG. 2A.

FIGS. 2A-4 illustrate various views of the mounted ball mount assembly 1A according to one exemplary embodiment. FIG. 2A is a left-side rear perspective view of a mounted ball mount assembly 1A including the bracket assembly 100 and the ball mount assembly 200 as shown in the mounted enclosure system 1 depicted in FIGS. 1A-1B. FIG. 2B is a right-side rear perspective view of the mounted ball mount assembly 1A shown in FIG. 2A. FIG. 3 is a front view of the mounted ball mount assembly 1A shown in FIG. 2A. FIG. 4 is a side view of the mounted ball mount assembly 1A shown in FIG. 2A. The views depicted in FIGS. 2A-4 show various assembled views of the mounted ball mount assembly 1A depicting how the mounting base 130, the clamping mechanism 150, and a ball mount 220 of the ball mount assembly 200 may fit together according to one exemplary embodiment. FIG. 5 shows an exploded view of the ball mount 220 of the ball mount assembly 200, the mounting base 130 of the bracket assembly 100, and the clamping mechanism 150 of the bracket assembly 100.

As illustrated in FIGS. 2A-5, the mounted ball mount assembly 1A includes the bracket assembly 100 and the ball mount assembly 200. The bracket assembly 100 includes the mounting base 130 and the clamping mechanism 150. The ball mount assembly 200 includes the ball mount 220, a compression fitting 260, and a sealing insert 280. As illustrated in FIG. 3, the mounting base 130 and the clamping mechanism 150 are configured to be fastened to each other on a first-end side S1 and on a second-end side S2. A first through hole axis Y1 extends through the clamping mechanism 150 on the first-end side S1 and a second through hole axis Y2 extends through the clamping mechanism 150 on the second-end side S2. As illustrated in FIG. 4, the clamping mechanism 150 comprises a center axis C1 and the ball mount 220 comprises a center axis C2. In certain angular configurations of the mounted ball mount assembly 1A, the center axis C1 and the center axis C2 may coincide. As illustrated in FIG. 5, the mounting base 130 and the clamping mechanism 150 may be configured such that the ball mount 220 may be adjustably supported between a mounting base contoured surface 132 of the mounting base 130 and a contoured surface 152 of the clamping mechanism 150.

Referring to FIGS. 2A-5 generally, when the ball mount 220 is supported by the clamping mechanism 150, the ball mount 220 may be configured to swivel relative to the mounting base 130 and/or the clamping mechanism 150. For example, in an adjustable configuration of the mounted ball mount assembly 1A, the mounting base 130 and the clamping mechanism 150 may be attached and/or fastened to one another, and in contact with the ball mount 220 at the mounting base contoured surface 132 and the contoured surface 152, such that an angle position of the ball mount 220 may be adjusted relative to the clamping mechanism 150 and/or the mounting base 130. Alternatively, the mounting base 130 and the clamping mechanism 150 may be attached and/or fastened to one another in a fixed configuration of the mounted ball mount assembly 1A, and in contact with the ball mount 220 at the mounting base contoured surface 132 and the contoured surface 152, such that an angle position of the ball mount 220 may be fixed relative to the clamping mechanism 150 and/or the mounting base 130.

According to one embodiment, the clamping mechanism 150 may be configured to bend a first amount toward the mounting base 130 and/or the ball mount assembly 200 in the adjustable configuration and the clamping mechanism 150 may be configured to bend a second amount toward the mounting base 130 and/or the ball mount assembly 200 in the fixed configuration. In this exemplary embodiment, the second amount which the clamping mechanism 150 may bend toward the mounting base 130 and/or the ball mount assembly 200 is greater than the first amount which the clamping mechanism 150 may bend toward the mounting base 130 and/or the ball mount assembly 200. In other words, a gap 112 between the clamping mechanism 150 and the mounting base 130 in a direction parallel to the second through hole axis Y2 on a second-end side S2 is larger when the clamping mechanism 150 is bent the first amount, or when the clamping mechanism 150 is unbent, than when the clamping mechanism 150 is bent the second amount.

The amount which the clamping mechanism 150 may bend increases between the first amount in the adjustable configuration and the second amount in the fixed configuration. However, it is to be understood that the present disclosure is not particularly limited to this embodiment. For example, the clamping mechanism 150 may be configured to bend toward the mounting base 130 and/or the ball mount assembly 200 after the clamping mechanism 150 is in the fixed configuration. In an alternate embodiment, the bending of the clamping mechanism 150 may begin to occur before the mounted ball mount assembly 1A is in the fixed configuration. The bending may continue to occur after the mounted ball mount assembly 1A is in the fixed configuration.

Mounted Ball Mount Assembly: Ball Mount Assembly

Figure 6:
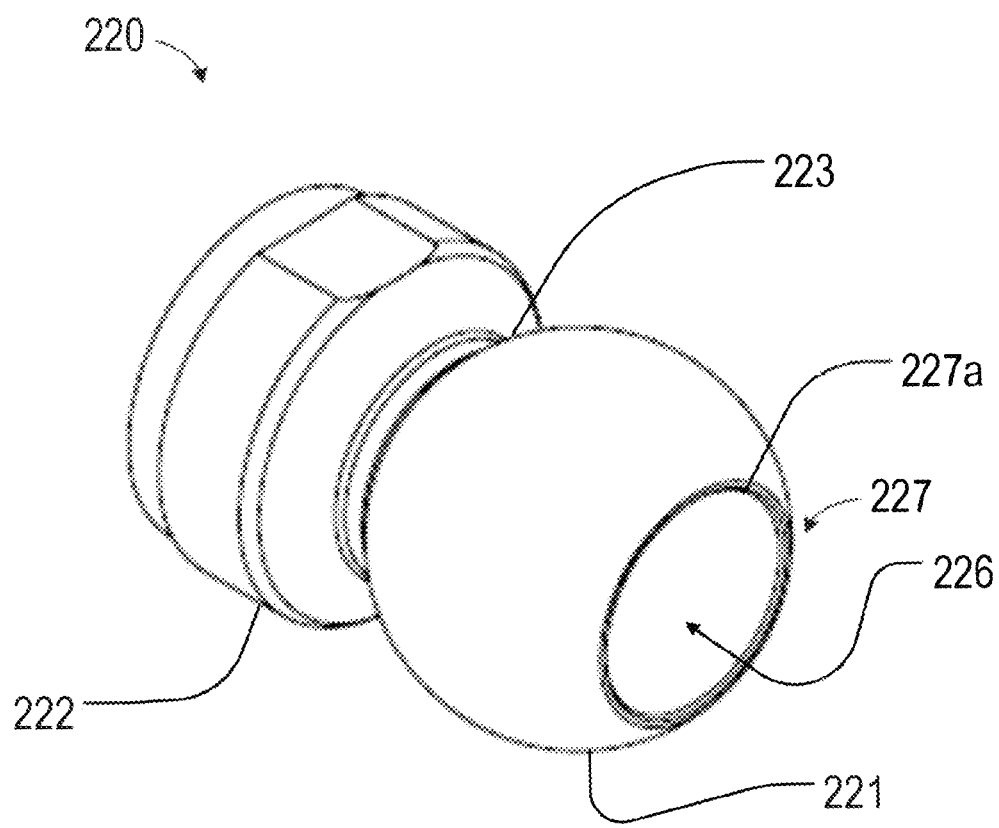
FIG. 6 is a perspective view of the ball mount shown in FIG. 5.

The ball mount assembly 200 according to the exemplary embodiment shown in FIGS. 2A-5, includes a ball mount 220, a compression fitting 260 having a head 261, and a sealing insert 280 having a slit portion 281. The ball mount 220, as shown in further detail in FIG. 6, includes a body portion 221, a base portion 222, a neck 223 coupling the body portion 221 to the base portion 222, and an internal passage 226. The body portion 221 includes an opening 227a and the base portion 222 includes an opening 228a. The opening 227a and the opening 228a may be arranged concentrically about the center axis C2 of the ball mount 220. The internal passage 226 of the ball mount 220 is defined by a first sidewall 227, a second sidewall 228, and a shoulder portion 229. The internal passage 226 of the ball mount 220 is configured to extend between the opening 227a of the first sidewall 227 of the body portion 221 in an axial direction of the ball mount 220 to the opening 228a of the second sidewall 228 of the base portion 222.

The sealing insert 280 is configured to be inserted into the internal passage 226 of the ball mount 220 and secured in the internal passage 226 by the compression fitting 260. The compression fitting 260 may be configured to be fit to the ball mount 220 such that the sealing insert 280 is securely interposed between the compression fitting 260 and the ball mount 220 in the internal passage 226. The ball mount 220, the compression fitting 260, and the sealing insert 280 are each configured to allow a cable 600 to pass therethrough. In one embodiment, the bracket assembly 100 may be configured to support the ball mount assembly 200 such that the mounting base 130 and the clamping mechanism 150 allow the cable 600 to pass through the bracket assembly 100.

Figure 10A:
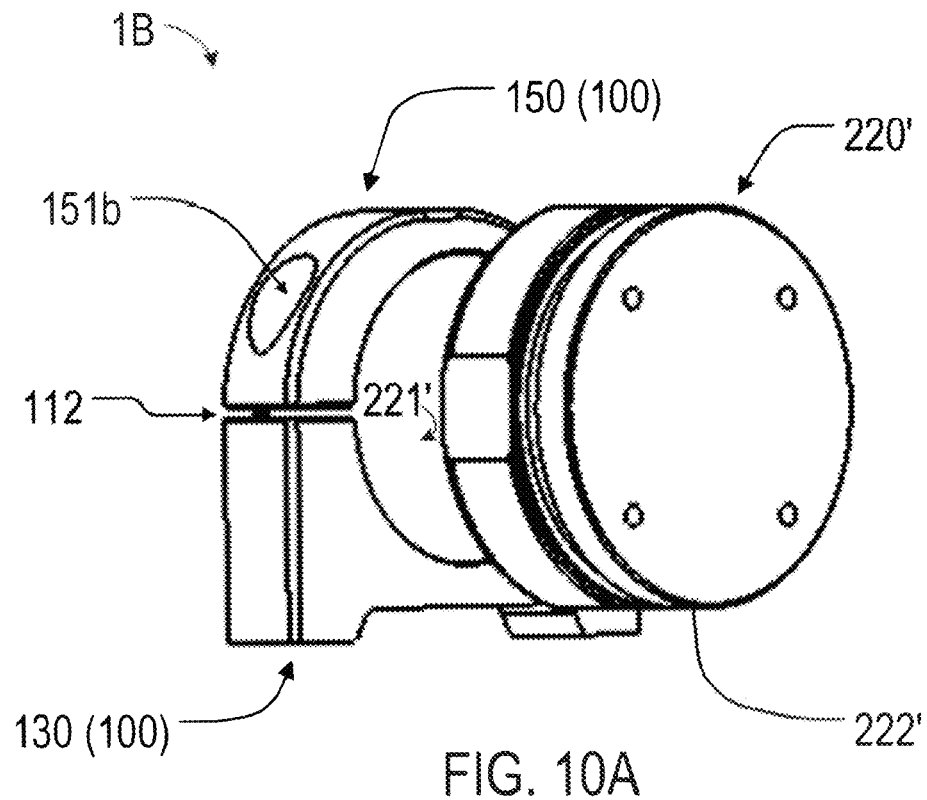
FIG. 10A is a left-side rear perspective view of a mounted ball mount assembly, according to another embodiment.
Figure 10B:
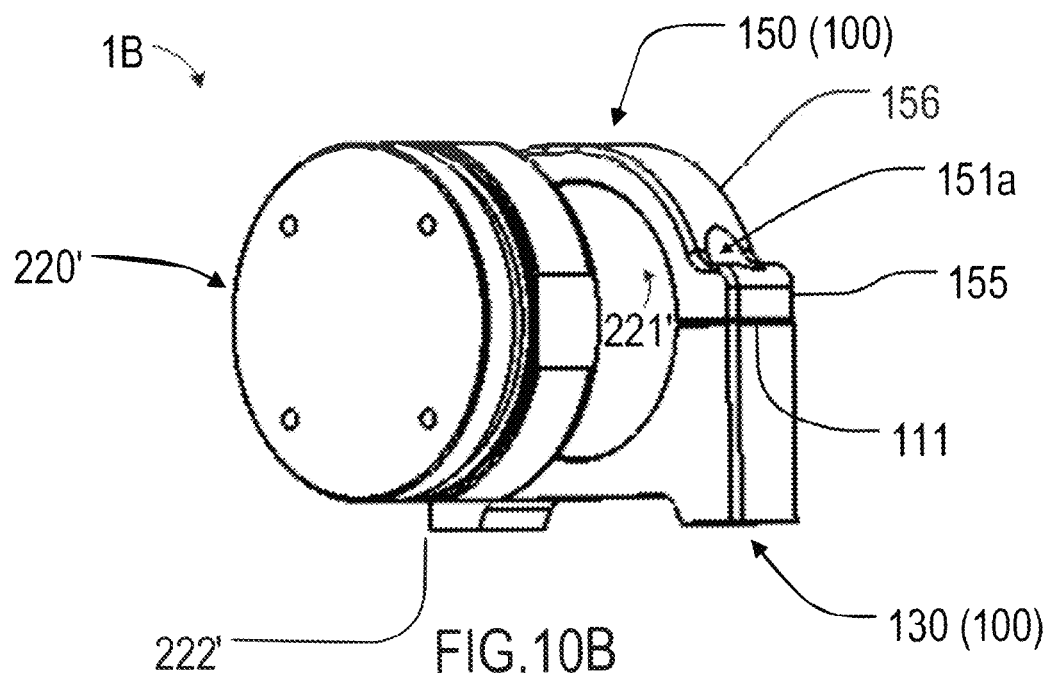
FIG. 10B is a right-side rear perspective view of the mounted ball mount assembly shown in FIG. 10A.
Figure 12:
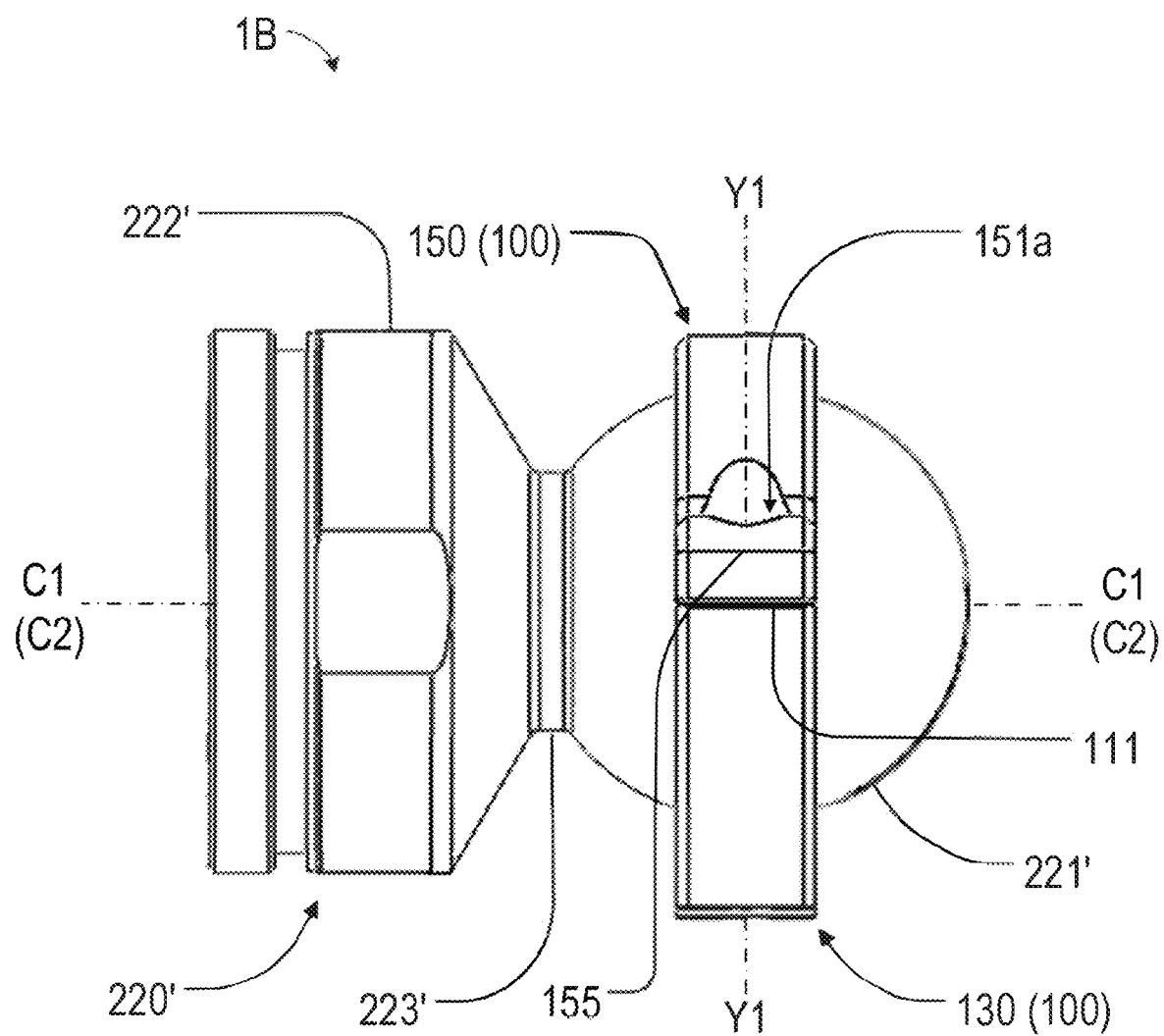
FIG. 12 is a side view of the mounted ball mount assembly shown in FIG. 10A.
Figure 13:
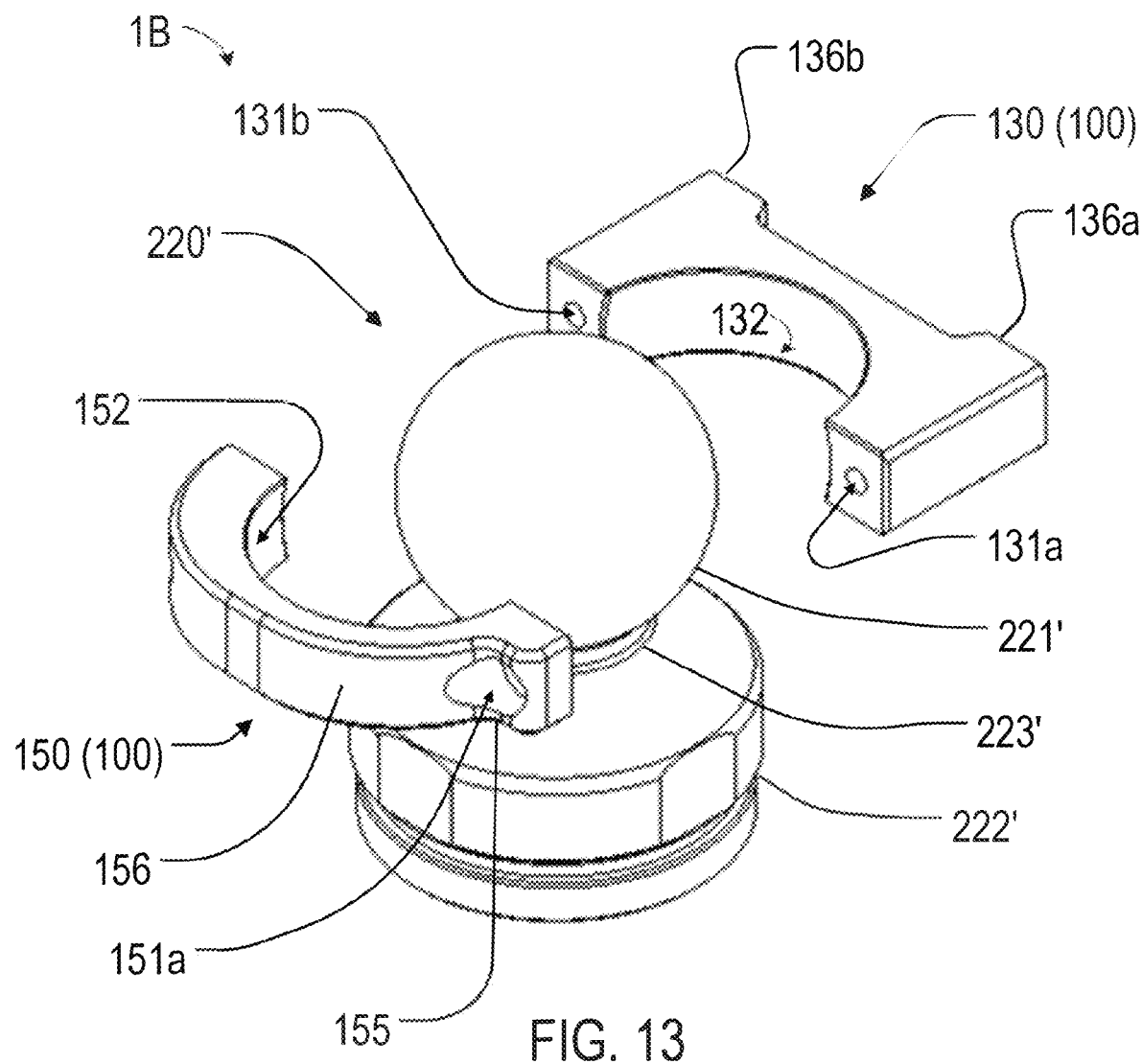
FIG. 13 is an exploded view of a ball mount and a bracket assembly, according to the embodiment shown in FIG. 10A.
Figure 14:
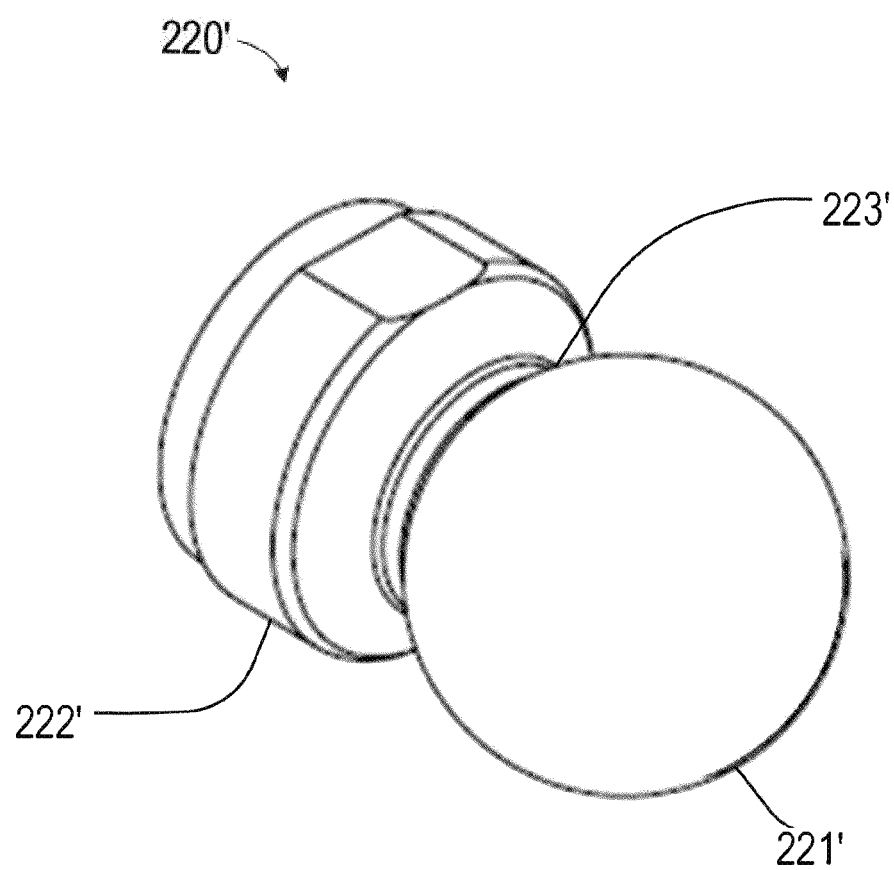
FIG. 14 is a perspective view of the ball mount shown in FIG. 10A.

According to an alternative embodiment, as shown in FIGS. 10A-13, the mounting base 130 and the clamping mechanism 150 may be configured to support a ball mount 220' including a conventional body portion 221' having a uniform surface. FIGS. 10A-13 illustrate various views of the mounted ball mount assembly 1B. FIGS. 10A-10B illustrate a left-side rear perspective view and a right-side rear perspective view, respectively, of a mounted ball mount assembly 1B including the bracket assembly 100 and the ball mount 220'. FIG. 11 is a front view of the mounted ball mount assembly 1B shown in FIG. 10A. FIG. 12 is a side view of the mounted ball mount assembly 1B shown in FIG. 10A. FIG. 13 is an exploded view of the ball mount 220' and a bracket assembly 100 including the mounting base 130 and the clamping mechanism 150, according to the embodiment shown in FIG. 10A. FIG. 14 is a perspective view of the ball mount 220' shown in FIG. 10A.

The alternative embodiment of the ball mount 220' shown in FIGS. 10A-14 is similar to the embodiment of the ball mount assembly 200 comprising the ball mount 220 shown in FIGS. 1A-6, and described above, except for the differences described herein. The ball mount 220', as shown in further detail in FIG. 14, includes the conventional body portion 221', a base portion 222', and a neck 223' coupling the conventional body portion 221' to the base portion 222'. The conventional body portion 221' of the ball mount 220' comprises a solid surface. One technical advantage of the solid surface of the conventional body portion 221' of the ball mount 220' is that an angle position of the ball mount 220' may be adjusted relative to the clamping mechanism 150 and/or the mounting base 130 to a greater degree than an angle position of the ball mount 220' may be adjusted relative to the clamping mechanism 150 and/or the mounting base 130 in certain embodiments. The structure of the bracket assembly 100 including the mounting base 130 and the clamping mechanism 150, and the components thereof, are described in more detail below.

Mounted Ball Mount Assembly: Bracket Assembly

Referring back to FIGS. 2A-5, the bracket assembly 100 includes the mounting base 130 and the clamping mechanism 150. According to one embodiment of the bracket assembly 100, the mounting base 130, as illustrated in further detail in FIG. 7, and the clamping mechanism 150, as illustrated in further detail in FIGS. 8A-9D, may be configured such that the ball mount 220 is adjustably supported and/or fixed between the mounting base contoured surface 132 of the mounting base 130 and the contoured surface 152 of the clamping mechanism 150 when the clamping mechanism 150 is fastened/attached to the mounting base 130.

In one embodiment, the mounting base 130 and/or the clamping mechanism 150 may comprise a single material or multiple materials. For example, in one embodiment the first-end portion 153a may comprise a first material and the second-end portion 153b may comprise a second material. The first material may have a greater flexibility than the second material such that a first bend allowance of the first-end portion 153a is greater than a second bend allowance of the second-end portion 153b. As such, the first-end portion 153a having the first material is able to be bent toward the mounting base 130 and/or the ball mount assembly 200 as the clamping mechanism 150 is attached to the mounting base 130.

The mounting base 130 and/or the clamping mechanism 150 may be made of any suitable material or materials. For example, the mounting base 130 and/or the clamping mechanism 150 may be made of aluminum, plastic, and/or stainless steel so long as the dimensional configuration of the mounting base 130 and/or the clamping mechanism 150 are optimized based on the properties of the material or materials used. In one embodiment, the mounting base 130 and/or the clamping mechanism 150 may comprise food-grade metals known in the field, such as 316 stainless steel, or food-grade plastic resins known in the field, such as polypropylene.

Mounting Base

Figure 7:
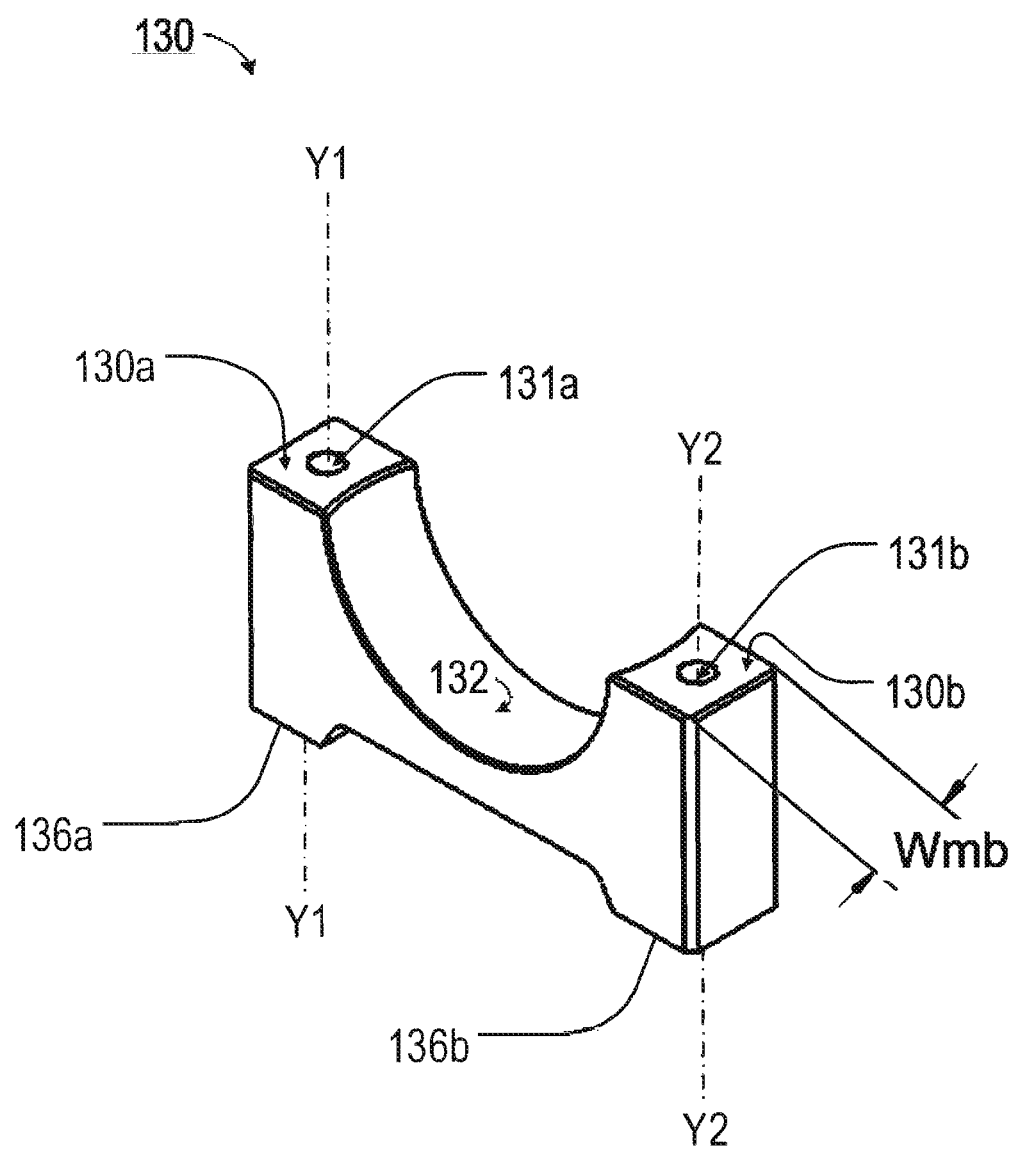
FIG. 7 is a perspective view of a mounting base, as shown in FIG. 5.

As illustrated in FIG. 7, the mounting base 130 includes a first mounting base through hole 131a extending through a first surface 130a, a second mounting base through hole 131b extending through a second surface 130b, the mounting base contoured surface 132, a first leg 136a, and a second leg 136b. According to one embodiment, the mounting base 130 is configured such that the mounting base contoured surface 132 is configured to cradle a body portion 221 of the ball mount 220. In some embodiments, the first leg 136a and the second leg 136b are configured to be affixed to, or integrated with, a supporting surface such as a wall, floor, system, device, or the like. The first mounting base through hole 131a is configured such that the first through hole axis Y1 extends through the first mounting base through hole 131a. The second mounting base through hole 131b is configured such that the second through hole axis Y2 extends through the second mounting base through hole 131b. In other embodiments, a through hole axis does not extend through a mounting base through hole. The first through hole axis Y1 and the second through hole axis Y2 are configured to be substantially parallel to one another and to be positioned on opposite sides of the ball mount 220 when the ball mount 220 is supported by the clamping mechanism 150 and the mounting base 130.

According to one embodiment, the width Wmb of the mounting base 130 and the width Wcm of the clamping mechanism 150 should be large enough to provide a mating interface 111 between the mounting base 130 and the clamping mechanism 150. The first bottom surface 150a of the clamping mechanism 150 is configured to be in direct contact with the first surface 130a of the mounting base 130. Generally, the mounting base 130 may be designed to accommodate the ball mount 220 through a variety of different configurations so long as the mounting base 130 is configured to support the ball mount 220 and to be attachable to the clamping mechanism 150, and it is to be understood that the present disclosure is not particularly limited to the embodiment described herein.

Figure 15:
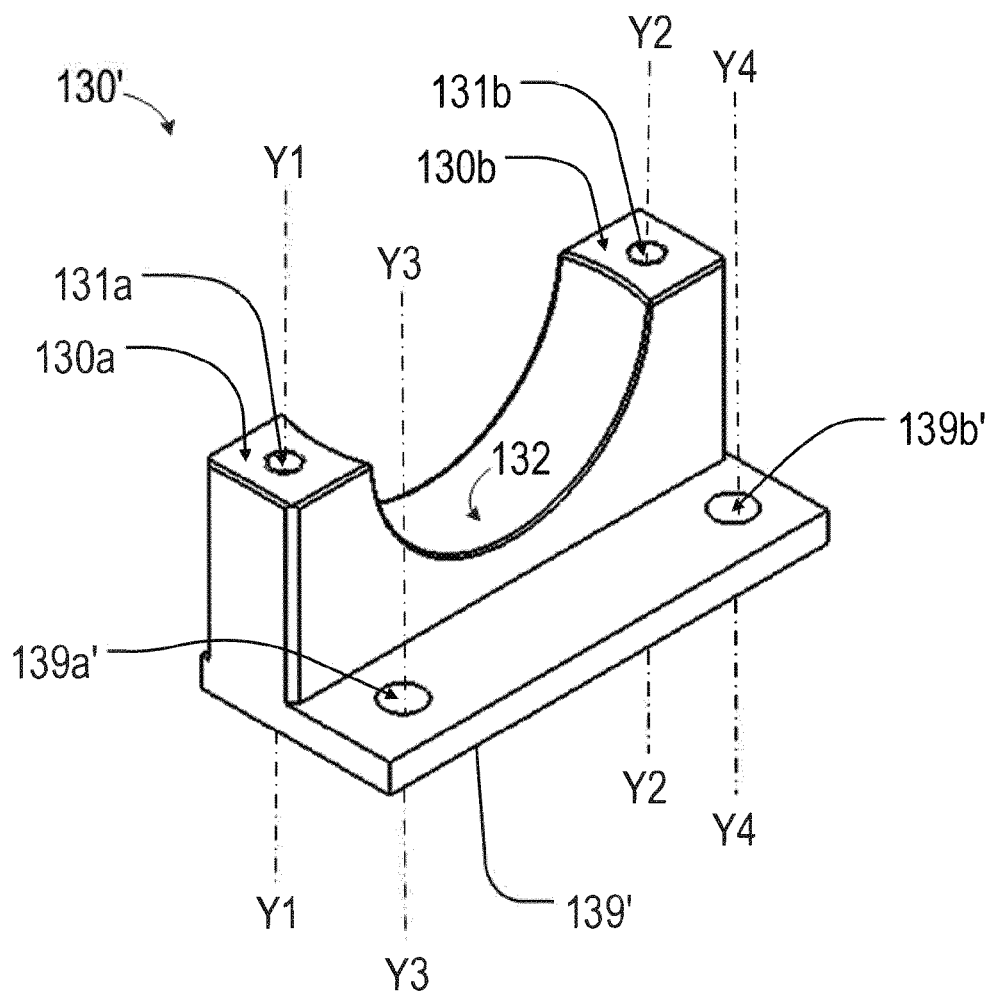
FIG. 15 is a perspective view of a mounting base according to another embodiment.

For example, an alternate embodiment of the mounting base 130' is illustrated in FIG. 15. The alternate embodiment of the mounting base 130' illustrated in FIG. 15 is similar to the embodiment of the mounting base 130 shown in FIG. 7, and described above, except for the differences described herein. The alternate embodiment of the mounting base 130' includes a mounting bracket 139' having a first base mounting hole 139a' and a second base mounting hole 139b'. The first base mounting hole 139a' is configured such that a third through hole axis Y3 extends through the first base mounting hole 139a', and the second base mounting hole 139b' is configured such that a fourth through hole axis Y4 extends through the second base mounting hole 139b'. The mounting bracket 139' of the mounting base 130' is configured to be affixed to or integrated with a supporting surface such as a wall, floor, system, device, or the like.

Clamping Mechanism

Figure 8A:
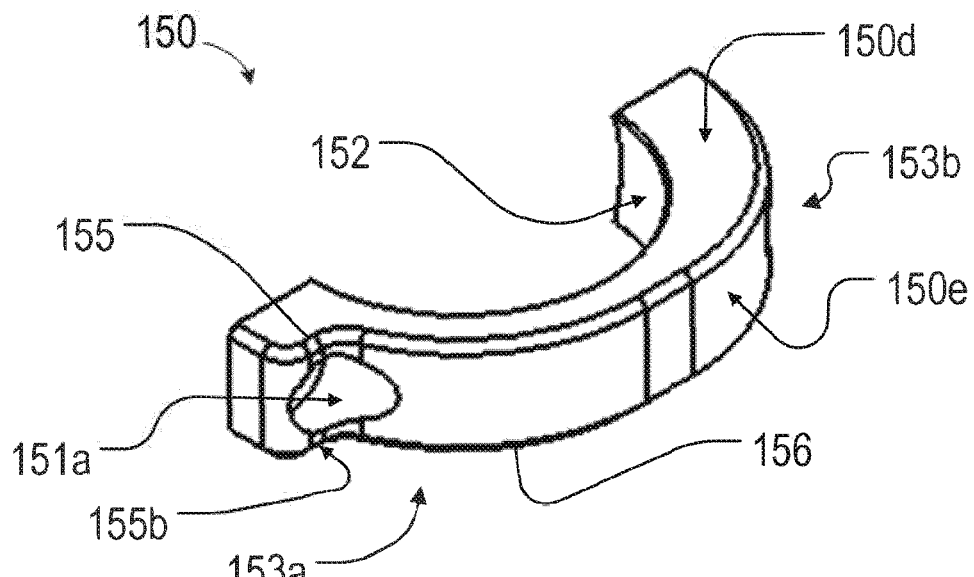
FIG. 8A is a top perspective view of the clamping mechanism shown in FIG. 5.

The clamping mechanism 150 is illustrated in further detail in FIGS. 8A-9D. FIG. 8A is a top perspective view of the clamping mechanism 150 shown in FIG. 5. FIG. 8B is a bottom perspective view of the clamping mechanism 150 shown in FIG. 8A. FIGS. 9A-9D generally relate to the dimensional configurations of the clamping mechanism 150 according to certain non-limiting embodiments, and are discussed in further detail below.

Figure 8B:
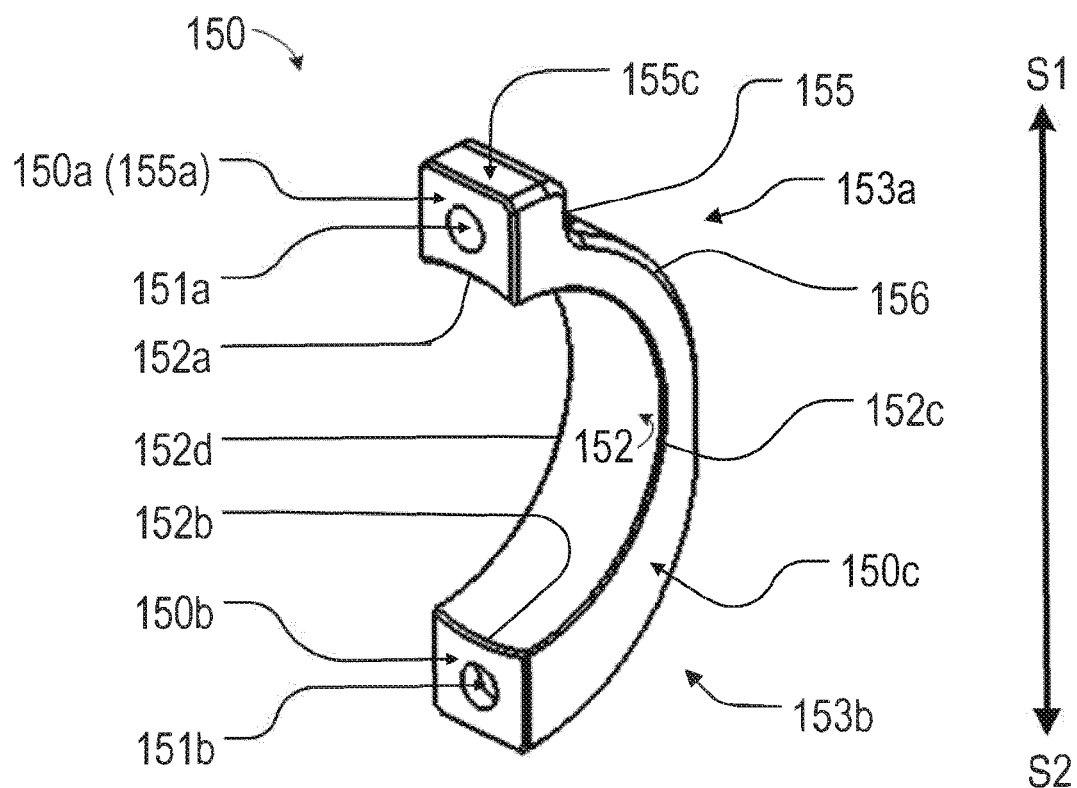
FIG. 8B is a bottom perspective view of the clamping mechanism shown in FIG. 8A.

As illustrated in FIGS. 8A-8B, the clamping mechanism 150 is comprised of a first-end portion 153a having a flexible section 156 and a second-end portion 153b located on a first-end side S1 and a second-end side S2 of the clamping mechanism 150, respectively. According to an exemplary embodiment, the first-end portion 153a may correspond to a thin-end portion and a second-end portion 153b may correspond to a thick-end portion; however, the present disclosure is not to be limited to such a configuration. The clamping mechanism 150 may include a first bottom surface 150a on the first-end portion 153a, a second bottom surface 150b on the second-end portion 153b, a front surface 150c, a rear surface 150d, a top surface 150e disposed between the front surface 150c and the rear surface 150d, and a contoured surface 152 configured to cradle the body portion 221 of the ball mount 220.

The contoured surface 152 includes a first edge 152a formed between the first bottom surface 150a and the contoured surface 152 on the first-end portion 153a, a second edge 152b formed between the second bottom surface 150b and the contoured surface 152 on the second-end portion 153b, a front edge 152c formed between the front surface 150c and the contoured surface 152, and a rear edge 152d formed between the rear surface 150d and the contoured surface 152. The first edge 152a, the second edge 152b, the front edge 152c, and the rear edge 152d of the contoured surface 152 contour the body portion 221 of the ball mount 220. The contoured surface 152 is located opposite the top surface 150e and oriented toward the mounting base contoured surface 132 in the assembled, bracket assembly 100.

In both the adjustable configuration (partially fastened state) and the fixed configuration (fully fastened state), the first edge 152a is configured to make direct contact with the mounting base 130 at a mating interface 111. Additionally, in both the partially fastened state and the fully fastened state the second edge 152b is configured to be separated from the mounting base 130 by a gap 112 in order to allow for a space for the clamping mechanism 150 to bend as the second-end portion 153b is clamped toward the mounting base 130. A seam is thereby formed between the second bottom surface 150b and the second surface 130b along the gap 112.

According to one embodiment, the front edge 152c is configured to form an arc shape across the clamping mechanism 150 from the first bottom surface 150a to the second bottom surface 150b, and the rear edge 152d is configured to form an arc shape across the clamping mechanism 150 from the first bottom surface 150a to the second bottom surface 150b. The arc formed by the front edge 152c and the rear edge 152d may have the same radius of curvature. The arc formed by the front edge 152c and/or the rear edge 152d may form the basis for establishing the center point C, and the center axis C1, with respect to which various radial cross-sectional areas of the clamping mechanism 150 may be measured. For example, a radial cross-sectional area of the flexible section 156 and a radial cross-sectional area of the second-end portion 153b may be located in intersecting planes which intersect along the center axis C1 of the contoured surface 152 which extends through the center point C of the arc defined by the front edge 152c and/or the rear edge 152d of the contoured surface 152. In one embodiment, the ball mount assembly 200 and the bracket assembly 100 may be configured such that the center axis C1 of the contoured surface 152 is also a center axis C2 of the ball mount 220.

The first-end portion 153a includes a tab 155, the flexible section 156 disposed between the tab 155 and the second-end portion 153b, the first bottom surface 150a extending in a first plane, and a first through hole 151a configured to extend through the first bottom surface 150a. The first-end portion 153a of the clamping mechanism 150 is located on the first-end side S1 of the clamping mechanism 150 including the flexible section 156 and is configured to be bendable toward the mounting base 130 and/or the ball mount assembly 200 as the clamping mechanism 150 is fastened to the mounting base 130. In one embodiment, the second-end portion 153b may transition from the second-end portion 153b to the first-end portion 153a at an arbitrary location between the flexible section 156 of the first-end portion 153a and the second bottom surface 150b.

The tab 155 of the first-end portion 153a may include a top face 155b, a bottom face 155a extending away from the first edge 152a of the contoured surface 152, a side face 155c which may be substantially perpendicular to the top face 155b and/or the bottom face 155a. The bottom face 155a and the top face 155b may be substantially parallel to one another. The top face 155b, in certain embodiments, may be smaller than the bottom face 155a. In one embodiment, the bottom face 155a of the tab 155 is the same surface as the first bottom surface 150a of the clamping mechanism 150. In another embodiment, the bottom face 155a of the tab 155 is a portion of the first bottom surface 150a of the clamping mechanism 150 such that the bottom face 155a is not configured to contact the first edge 152a. In yet another embodiment, the bottom face 155a of the tab 155 may be separate from the first bottom surface 150a of the clamping mechanism 150 such that the bottom face 155a is not configured to directly contact the first surface 130a of the mounting base 130. The tab 155 may be configured such that the first through hole 151a extends through the top face 155b and the bottom face 155a of the tab 155.

The flexible section 156 of the first-end portion 153a may be disposed between the second-end portion 153b and the tab 155. When the clamping mechanism 150 is in an adjustable configuration, in which the clamping mechanism 150 is attached, loosened, and/or adjusted to the mounting base 130 such that the ball mount 220 is adjustable relative to the clamping mechanism 150 and/or the mounting base 130, the flexible section 156 may be configured to bend toward the mounting base 130 and/or the ball mount assembly 200.

When the clamping mechanism 150 is in a fixed configuration, in which the ball mount 220 is in a fixed position relative to the mounting base 130 and/or the clamping mechanism 150, the flexible section 156 is configured to bend toward the mounting base 130 and/or the ball mount assembly 200 to an amount greater than the amount which the flexible section 156 may be bent, if at all, in the adjustable configuration. In certain embodiments, the flexible section 156 may not begin to bend until the clamping mechanism is in the fixed configuration. The first-end portion 153a of the clamping mechanism 150 may further be configured to bend back to an initial (unbent) state once the clamping mechanism is adjusted from the fixed configuration to the adjustable configuration. The materials selected for the clamping mechanism 150 preferably enable the flexible section 156 of the first-end portion 153a to bend and unbend in cycle without damage or fatigue to the first-end portion 153a due to repetitive cycles of stress on the flexible section 156.

According to one embodiment, the flexible section 156 may be disposed directly adjacent to the second-end portion 153b and directly adjacent to the tab 155. In another embodiment, the flexible section 156 may be disposed directly adjacent to the second-end portion 153b and spaced apart from the tab 155 by some distance. In yet another embodiment, the flexible section 156 may be disposed directly adjacent to the tab 155 and spaced apart from the second-end portion 153b by some other distance defined by an intermediate portion of the clamping mechanism 150 disposed between the first-end portion 153a and the second-end portion 153b. For example, in an alternate embodiment, an intermediate portion of uniform thickness may be interposed between the first-end portion 153a and the second-end portion 153b.

Figure 9B:
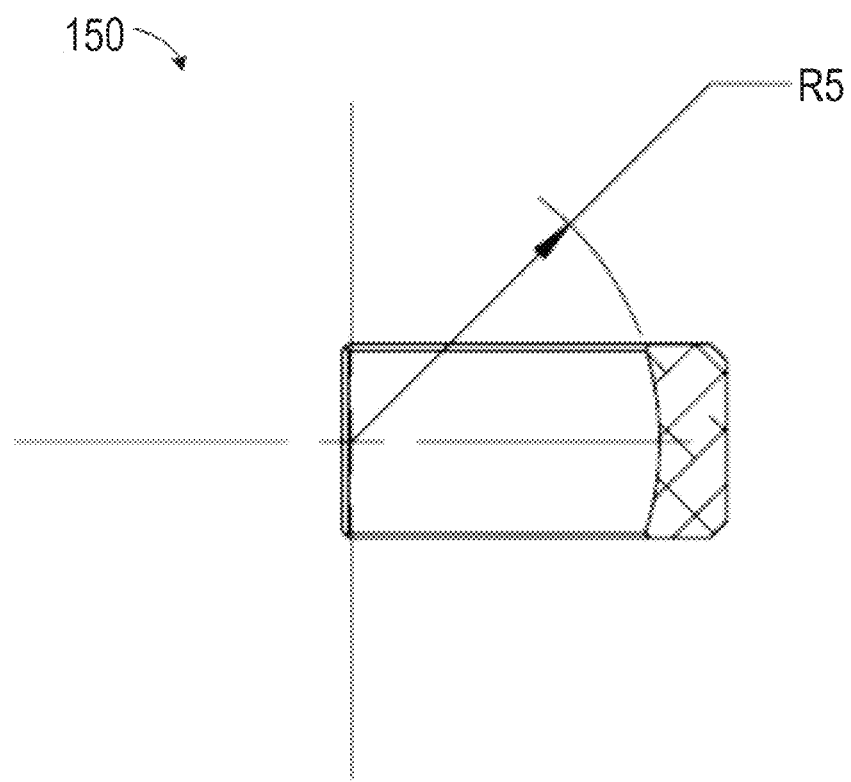
FIG. 9B is a cross-sectional view of the clamping mechanism between lines IXB and IXB shown in FIG. 9A.
Figure 9C:
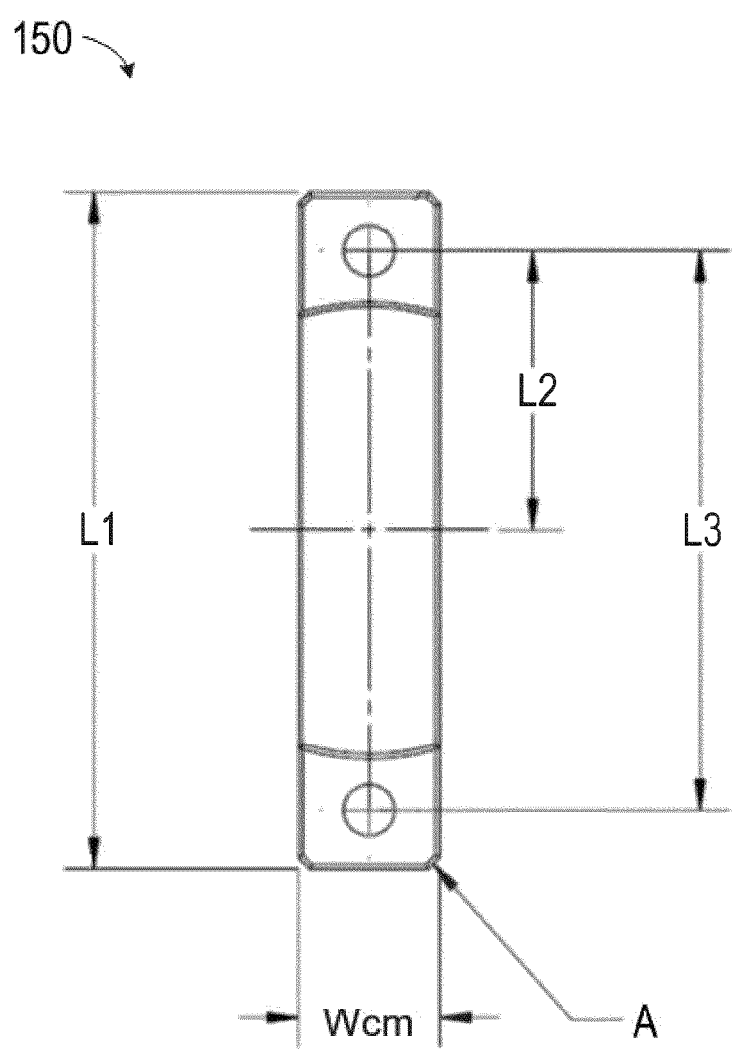
FIG. 9C is a bottom view of the clamping mechanism shown in FIG. 8A.
Figure 9D:
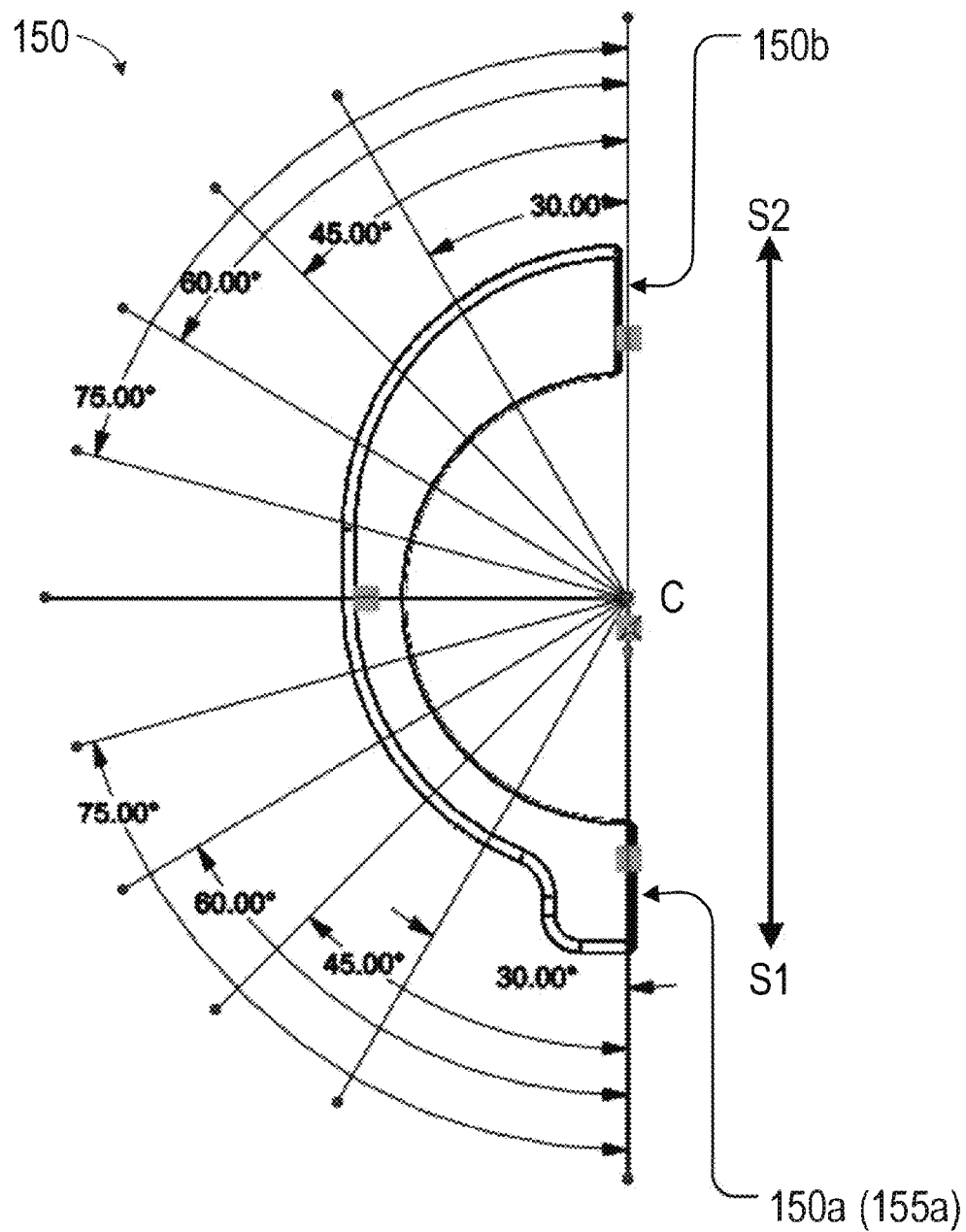
FIG. 9D is a rotated front view of the clamping mechanism shown in FIG. 9A.

According to one embodiment, an average thickness of the first-end portion 153a is less than an average thickness of the second-end portion 153b, as measured along the radial cross-sectional areas of the clamping mechanism 150. The radial cross-sectional area of the flexible section 156 and the radial cross-sectional area of the second-end portion 153b may be located in intersecting planes which intersect along a center axis C1 of the contoured surface 152, the center axis C1 extending through a center point C of an arc defined by the front edge 152c and/or the rear edge 152d of the contoured surface 152, as illustrated in FIG. 9D. According to the exemplary embodiment illustrated in FIGS. 8A-8B, the radial cross-sectional area of the flexible section 156 is less than any radial cross-sectional area of the second-end portion 153b and any radial cross-sectional area of the tab 155.

The largest radial cross-sectional area of the tab 155 may be less than, or approximately equal to, the largest radial cross-sectional area of the second-end portion 153b. The largest cross-sectional area of the second-end portion 153b is located at, or near, the second bottom surface 150b. However, it is to be understood that the present disclosure is not particularly limited to the embodiment described herein. For example, in an alternate embodiment, the largest radial cross-sectional area of the tab 155 may be equal to or greater than the largest radial cross-sectional area of the second-end portion 153b.

In one embodiment, the thinnest radial cross-sectional area of the flexible section 156 is approximately 10% less than the largest radial cross-sectional area of the tab 155 and/or the largest radial cross-sectional area of the second-end portion 153b. In another embodiment, the thinnest radial cross-sectional area of the flexible section 156 is approximately 20% less than the largest radial cross-sectional area of the tab 155 and/or the largest radial cross-sectional area of the second-end portion 153b. In yet another embodiment, the thinnest radial cross-sectional area of the flexible section 156 is approximately 30% less than the largest radial cross-sectional area of the tab 155 and/or the largest radial cross-sectional area of the second-end portion 153b. In yet another embodiment, the thinnest radial cross-sectional area of the flexible section 156 is approximately 40% less than the largest radial cross-sectional area of the tab 155 and/or the largest radial cross-sectional area of the second-end portion 153b.

Although the embodiment of the clamping mechanism 150 illustrated in FIGS. 8A-9D depict a first-end portion 153a, which corresponds to a thin-end portion, and a second-end portion 153b, which corresponds to a thick-end portion, it is to be understood that the instant disclosure is not limited to such an embodiment. For example, in an alternate embodiment, an average thickness of the first-end portion 153a may be greater than an average thickness of the second-end portion 153b so long as the flexible section 156 is configured to bend due to its high bend allowance which is greater than the bend allowance of the second-end portion 153b. In another alternate embodiment, the radial cross-sectional area of the flexible section 156 may be larger than the radial cross-sectional area of the second-end portion 153b and/or the radial cross-sectional area of the tab 155 so long as the flexible section 156 is configured to bend due to its high bend allowance.

The second-end portion 153b includes the second bottom surface 150b extending in a second plane and the second through hole 151b configured to extend through the second bottom surface 150b. The second plane being offset from the first plane of the first bottom surface 150a such that the offset between the first plane and the second plane forms the gap 112, as illustrated in FIG. 3, when the first bottom surface 150a is in contact with the first surface 130a of the mounting base 130. The second-end portion 153b of the clamping mechanism 150 is located on the second-end side S2 of the clamping mechanism 150 and is configured such that the thickness of the second-end portion 153b is greater than the thickness of the flexible section 156 of the first-end portion 153a. The thickness of the second-end portion 153b, as measured in the radial direction described above, may be configured to decrease in the first-end side S1 direction of the clamping mechanism 150 and to increase in the second-end side S2 direction. In an alternate embodiment, the second-end portion 153b may be substantially uniform in thickness.

As illustrated in the front view of the exemplary embodiment of the bracket assembly 100 shown in FIG. 3, the clamping mechanism 150 may be attached and/or fastened to the mounting base 130 such that the first-end portion 153a of the clamping mechanism 150 is in contact with the mounting base 130 and such that the second-end portion 153b of the clamping mechanism 150 is separated from the mounting base 130. According to one embodiment, the first bottom surface 150a of the first-end portion 153a is configured to be in direct contact with the first surface 130a of the mounting base 130 thereby forming the mating interface 111 when the mounting base 130 and the first bottom surface 150a are attached and/or fastened to one another via a first fastener (not shown) in both the adjustable configuration and the fixed configuration due to a first clamping force between the first bottom surface 150a and the first surface 130a. The first bottom surface 150a and the first surface 130a should be aligned and clamped securely such that the two surfaces do not separate or move in a shear direction when a load is applied to the second-end portion 153b or the bracket assembly 100 generally.

The second bottom surface 150b of the second-end portion 153b is configured to not contact the second surface 130b of the mounting base 130 such that a gap 112 remains between the second bottom surface 150b and the second surface 130b when the clamping mechanism 150 is in the adjustable configuration and the fixed configuration. The gap 112 between the second bottom surface 150b of the second-end portion 153b and the second surface 130b decreases, but remains, in the direction parallel to the second through hole axis Y2 on a second-end side S2 when a second clamping force between the second bottom surface 150b and the second surface 130b is applied via a second fastener (not shown).

The first clamping force between the first bottom surface 150a and the first surface 130a may be adjustable by any type of fastener known in the field, such as screws, bolts, or other type of fastener those skilled in the art will appreciate from this disclosure, and may form an interference fit, a threaded fit, a snap fit, or any other type of fit. The second clamping force between the second bottom surface 150b and the second surface 130b may be adjustable by any type of fastener known in the field, such as screws, bolts, or other type of fastener those skilled in the art will appreciate from this disclosure, so long as the fastener adjustably attaches the second bottom surface 150b with the second surface 130b.

In alternate embodiments, a spacing component may be interposed between the first bottom surface 150a and the first surface 130a and/or between the second bottom surface 150b and the second surface 130b. A spacing component interposed between the second bottom surface 150b and the second surface 130b may be made of conventional materials known in the field so long as the materials are capable of being deformable to enable the size of the gap 112, between the second bottom surface 150b of the clamping mechanism 150 and the second surface 130b of the mounting base 130, to become smaller as the clamping mechanism 150 is adjusted from the adjustable configuration to the fixed configuration.

The mounting base 130 and the clamping mechanism 150 may be attached to one another in a partially fastened state or a fully fastened state. The partially fastened state may result in an adjustable configuration in which the ball mount 220 may be adjustably positioned between the mounting base 130 and the clamping mechanism 150. According to one embodiment, when the mounting base 130 and the clamping mechanism 150 are attached to one another in the partially fastened state, and in contact with the ball mount 220 such that an angle position of the ball mount 220 may be adjusted relative to the clamping mechanism 150 and/or the mounting base 130, the second-end portion 153b of the clamping mechanism 150 is configured to be separated from the mounting base 130 when the first-end portion 153a of the clamping mechanism 150 is in contact with the mounting base 130. The shape of the clamping mechanism 150 in the partially fastened state may be the same as the clamping mechanism 150 when it is not attached to the mounting base 130.

According to one embodiment, the fully fastened state results in a fixed configuration in which the ball mount 220 is fixed relative to the clamping mechanism 150 and the mounting base 130. When the mounting base 130 and the clamping mechanism 150 are attached to one another in the fully fastened state, and in contact with the ball mount 220 such that an angle position of the ball mount 220 is fixed relative to the clamping mechanism 150 and/or the mounting base 130, the second-end portion 153b of the clamping mechanism 150 is not configured to contact the mounting base 130 when the first-end portion 153a of the clamping mechanism 150 is in contact with the mounting base 130. Thus, the gap 112 remains between the surface of the second-end portion 153b and the mounting base 130 even when the mounting base 130 and the clamping mechanism 150 are in the fully fastened state. In a preferred embodiment, adjustment between the partially fastened state and the fully fastened state is achieved by adjusting the second fastener while the first fastener ensures direct contact between the first bottom surface 150a of the first-end portion 153a and the first surface 130a of the mounting base 130 forming the mating interface 111.

The mounting base 130 and the clamping mechanism 150 may be attachable to one another via a first fastener along the first through hole axis Y1 and a second fastener along the second through hole axis Y2 (fasteners not illustrated). The first fastener and the second fastener are configured to fasten the first through hole 151a and the second through hole 151b to the first mounting base through hole 131a and the second mounting base through hole 131b, respectively. The first-end portion 153a is configured to be bendable toward the ball mount 220 when the clamping mechanism 150 is fully attached to the mounting base 130 via the first fastener and as the clamping mechanism 150 approaches the fully fastened state via the second fastener.

The first through hole 151a and the second through hole 151b may be formed by any procedure and configured in any shape known in the field, such as a counterbore hole, a countersink hole, or other type of hole those skilled in the art will appreciate from this disclosure so long as a fastener extending through the first through hole 151a and/or the second through hole 151b is capable of restricting shear movement of the clamping mechanism 150 relative to the mounting base 130.

Figure 16A:
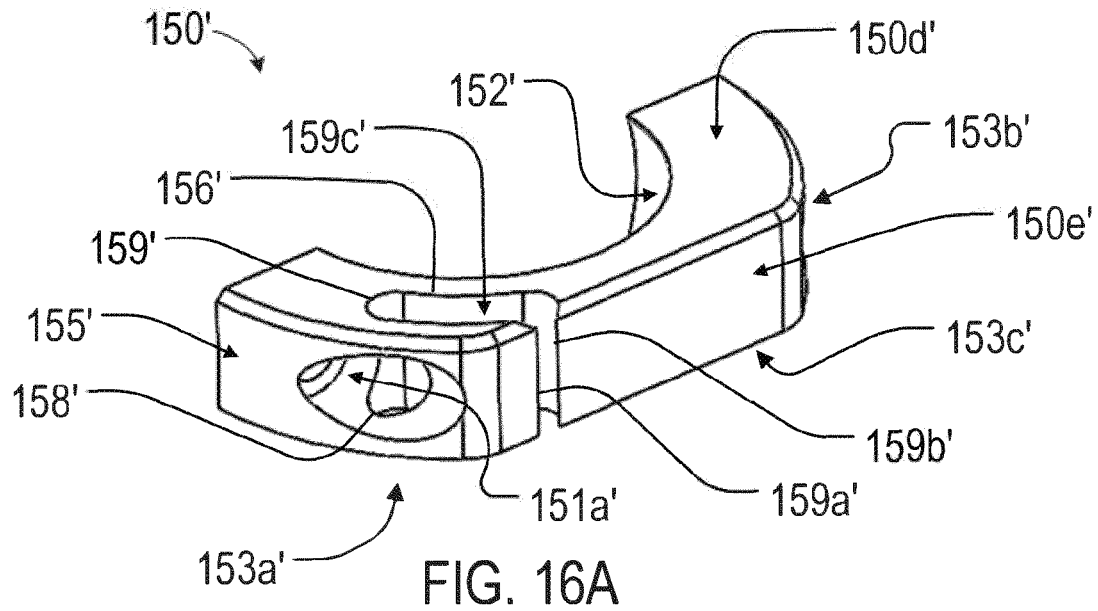
FIG. 16A is a top perspective view of the clamping mechanism according to another embodiment.
Figure 16B:
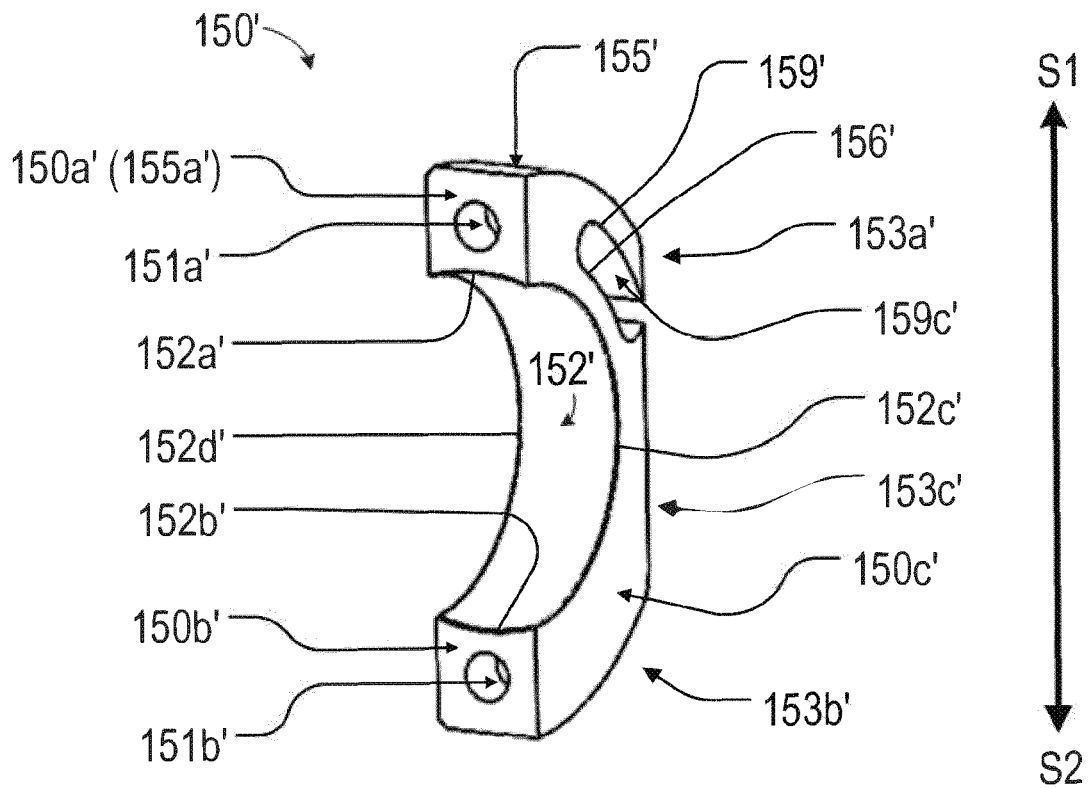
FIG. 16B is a bottom perspective view of the clamping mechanism shown in FIG. 16A.
Figure 16C:
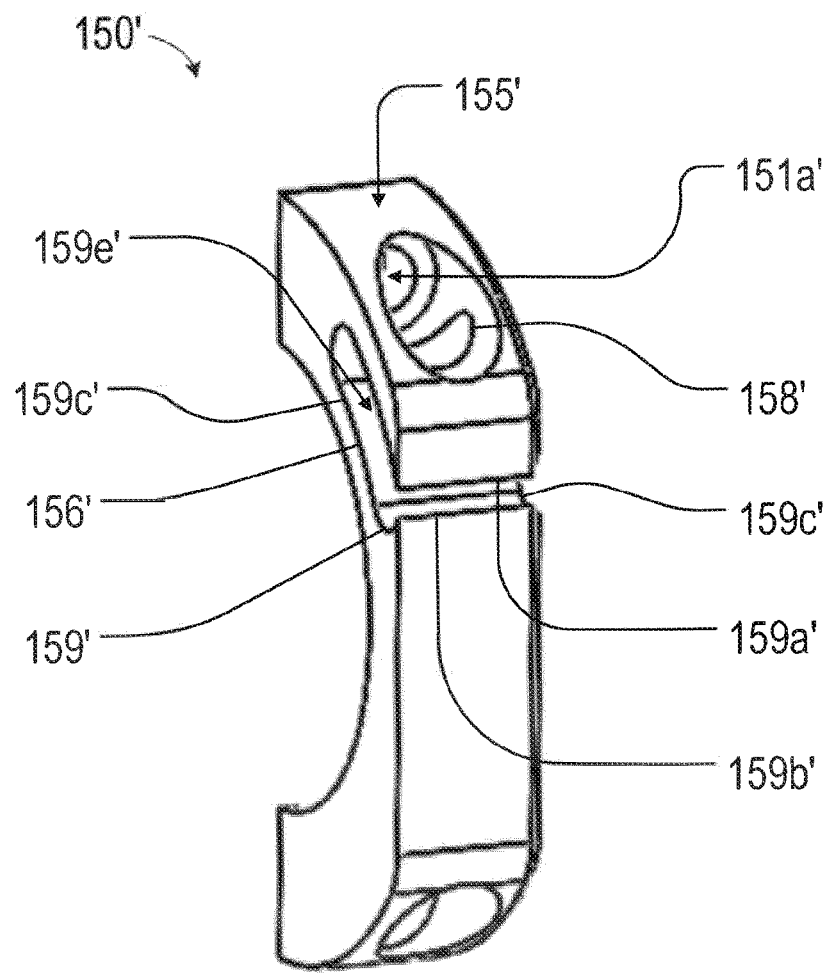
FIG. 16C is another top perspective view of the clamping mechanism shown in FIG. 16A.

It is to be understood that the present disclosure is not limited to the clamping mechanism 150 illustrated in FIGS. 8A-8B. For example, an alternative embodiment of the clamping mechanism 150' is illustrated in FIGS. 16A-16C. The alternate embodiment of the clamping mechanism 150' illustrated in FIGS. 16A-16C is similar to the embodiment of the clamping mechanism 150 shown in FIGS. 8A-8B and described in the instant specification except for the differences described herein.

According to one embodiment, the clamping mechanism 150' may include a modified first-end portion 153a', a second-end portion 153b', and an intermediate portion 153c' disposed therebetween. The intermediate portion 153c' may comprise a top surface 150e' and may separate the modified first-end portion 153a' from the second-end portion 153b'. The modified first-end portion 153a' may comprise a first through hole 151a', an integrated tab 155', a modified flexible section 156', a through hole 158', and a pocket 159'. The integrated tab 155' may be formed in the modified first-end portion 153a' and disposed between the pocket 159' and the bottom face 155a' of the integrated tab 155' and/or the first bottom surface 150a' of the clamping mechanism 150'. The pocket 159' comprises an inner pocket surface 159e' having the through hole 158' extending therethrough and may be formed into the modified first-end portion 153a'. According to one embodiment, the pocket 159' may be defined by a first top pocket edge 159a', a second top pocket edge 159b', a front pocket edge 159c', and a rear pocket edge 159d' such that the pocket 159' extends from the front surface 150c' to the rear surface 150d' of the clamping mechanism 150'.

The modified flexible section 156' is configured to be bendable toward the mounting base 130 and/or the ball mount assembly 200. In one embodiment, the modified flexible section 156' may be disposed between the integrated tab 155' and the intermediate portion 153c' and further disposed between the contoured surface 152' and the inner pocket surface 159e' of the pocket 159'. The modified flexible section 156' may comprise some or all of the portions of the modified first-end portion 153a' containing the pocket 159' in a radial cross-sectional area. In a preferred embodiment, the modified flexible section 156' includes the radial cross-sectional areas that are defined, in part, by the inner pocket surface 159e' of the modified first-end portion 153a'.

The average thickness of the modified flexible section 156' is less than the average thickness of the second-end portion 153b'. In a preferred embodiment, the radial cross-sectional areas of the modified flexible section 156' are less than the radial cross-sectional areas of the intermediate portion 153c', the radial cross-sectional areas of the second-end portion 153b', and/or the radial cross-sectional areas of the integrated tab 155'. However, it is to be understood that the present disclosure is not particularly limited to the embodiment described herein. For example, in an alternate embodiment, the largest radial cross-sectional area of the modified flexible section 156' may be equal to or greater than the largest radial cross-sectional area of the second-end portion 153b' so long as the modified flexible section 156' is configured to bend due to its high bend allowance which is greater than the bend allowance of the second-end portion 153b'.

The modified first-end portion 153a' may be fabricated by cutting, shaping, or molding the pocket 159' into the clamping mechanism 150'. One technical effect of the alternate embodiment illustrated in FIGS. 16A-16C, and described above, is that the modified flexible section 156' is configured to bend toward the mounting base 130 and/or the ball mount assembly 200 to an amount greater than the amount which the second-end portion 153b' may be bent. The flexibility or bendability of the modified first-end portion 153a' is further increased due to relief cuts at the first top pocket edge 159a' and the second top pocket edge 159b'.

Referring back to FIGS. 9A-9D, FIG. 9A illustrates a front view of the clamping mechanism 150 shown in FIG. 8A. FIG. 9B is a cross-sectional view of the clamping mechanism 150 between lines IXB and IXB shown in FIG. 9A. FIG. 9C is a bottom view of the clamping mechanism 150 shown in FIG. 8A. FIG. 9D illustrates a rotated front view of the clamping mechanism 150 shown in FIG. 9A.

As illustrated in FIG. 9A, the clamping mechanism 150 according to one embodiment has a first height H1 representing a distance between a top face 155b of the tab 155 and the bottom face 155a of the tab 155. The first height H1 may also represent a distance between the top face 155b of the tab 155 and the first bottom surface 150a of the clamping mechanism 150. The clamping mechanism 150 may further comprise a second height H2 representing a distance between the first bottom surface 150a or bottom face 155a of the tab 155 and the second bottom surface 150b. The clamping mechanism 150 may further comprise a third height H3 representing a distance between the chamfered edge A of the first-end portion 153a and the second bottom surface 150b. The clamping mechanism 150 may further comprise a fourth height H4 corresponding to the height of the clamping mechanism 150 between the front edge 152c or the rear edge 152d of the contoured surface 152 and the top surface 150e measured in the radial direction orthogonal to the first plane including the first bottom surface 150a. The clamping mechanism 150 may further comprise a fifth height H5 corresponding to the height of the clamping mechanism 150 between the second plane including the second bottom surface 150b and the top surface 150e measured in the radial direction orthogonal to the first plane including the first bottom surface 150a.

The second height H2 may correspond to the size of the gap 112 between the second bottom surface 150b of the clamping mechanism 150 and the second surface 130b of the mounting base 130 in the direction parallel to the second through hole axis Y2 on the second-end side S2. In certain configurations of the clamping mechanism 150, the second height H2 may correspond to the distance which the first plane and the second plane are offset from one another. The height of the gap 112 should be high enough to allow a fastener extending through the second through hole axis Y2 to be tightened such that when the clamping mechanism 150 contacts the ball mount 220, a clearance remains between the second bottom surface 150b and the second surface 130b at the gap 112.

The clamping mechanism 150 according to one embodiment may include a first radiused edge R1, a second radiused edge R2, a third radiused edge R3, a fourth radiused edge R4, and a fifth radiused edge R5. The first radiused edge R1 corresponds to the radius of curvature at the tab 155 between the side face 155c and the top face 155b. The second radiused edge R2 corresponds to the radius of curvature between the top face 155b of the tab 155 and the top surface 150e of the clamping mechanism 150. In one embodiment, the second radiused edge R2 may be formed between the top face 155b of the tab 155 and the top surface 150e of the clamping mechanism 150 at the flexible section 156. The first radiused edge R1 and the second radiused edge R2 may have the same radius of curvature; however, the present disclosure is not limited to such a configuration. The third radiused edge R3 corresponds to the radius of curvature of the arc formed by the front edge 152c and/or the rear edge 152d of the contoured surface 152. The fourth radiused edge R4 corresponds to the radius of curvature of the top surface 150e of the clamping mechanism 150 along the section of the first-end portion 153a including the flexible section 156.

In one embodiment, the third radiused edge R3 and the fourth radiused edge R4 are chosen to provide a flexible section 156 along the clamping mechanism 150 which will bend or flex when the second bottom surface 150b of the clamping mechanism 150 and the second surface 130b of the mounting base 130 are fastened together in the direction parallel to the second through hole axis Y2 on the second-end side S2 to support the ball mount 220 without creating a high stress concentration at the flexible section 156. The third radiused edge R3 is configured to have a radius of curvature slightly larger than a radius of curvature of the body portion 221 of the ball mount 220. As such, when the first bottom surface 150a of the clamping mechanism 150 and the first surface 130a of the mounting base 130 are fastened together in the direction parallel to the first through hole axis Y1 on the first-end side S1 to support the ball mount 220, the first faster configured to fasten the first through hole 151a to the first mounting base through hole 131a can be tightened to full torque while still allowing the ball/clamp joint to be adjusted before the second fastener is fully fastened.

The fifth radiused edge R5, illustrated in FIG. 9B, corresponds to the radius of curvature of the contoured surface 152 of the clamping mechanism 150 along a radial cross-sectional area of the clamping mechanism along lines IXB and IXB shown in FIG. 9A. The radius of curvature of the contoured surface 152 along lines IXB and IXB corresponds to the radius of curvature of the first edge 152a and/or the second edge 152b of the contoured surface 152. The fifth radiused edge R5 along the first edge 152a and/or the second edge 152b comprises a radius of curvature equal to or slightly less than the radius of curvature of the body portion 221 of the ball mount 220 in order to enable the ball mount to be adjustably clamped between the mounting base contoured surface 132 of the mounting base 130 and the contoured surface 152 of the clamping mechanism 150.

As illustrated in FIG. 9C, the clamping mechanism 150 according to one embodiment may include a first length L1 between the side face 155c of the tab 155 and an edge formed between the second bottom surface 150b and top surface 150e of the clamping mechanism 150, a second length L2 between the first through hole axis Y1 and the center axis C1 of the contoured surface 152, a third length L3 between the first through hole axis Y1 and the second through hole axis Y2, and a width Wcm of the clamping mechanism 150. The second length L2 may be configured to be one half of the third length L3; however, the present invention is not so limited. For example, in one embodiment, the second length L2 may be greater than one half of the third length L3 depending on the depth of the tab 155 extending in a first plane and/or the position of the first through hole 151a extending through the first bottom surface 150a. In another embodiment, the second length L2 may be less than one half of the third length L3 depending on the thickness of the second-end portion 153b and/or the position of the second through hole 151b extending through the second bottom surface 150b.

The length of the width Wcm of the clamping mechanism 150 should be large enough to provide a mating interface 111 such that the first bottom surface 150a of the clamping mechanism 150 is in direct contact with the first surface 130a of the mounting base 130. The width Wcm of the clamping mechanism 150 should be wide enough to provide a mating interface 111 large enough to counteract a bending force applied to the clamping mechanism 150 resulting from an external load applied to the ball mount 220 such that the ball mount 220 is configured to slip or rotate in the bracket assembly 100 prior to causing damage to the clamping mechanism 150.

As illustrated in FIG. 9D, the arc formed by the front edge 152c and/or the rear edge 152d of the clamping mechanism 150 may form the basis for establishing the center point C and the center axis C1, the center axis C1 of the clamping mechanism 150 extending out of the page containing FIG. 9D. The center point C and/or the center axis C1 may establish a reference point with respect to which the various radial cross-sectional areas may be measured.

According to one embodiment, the radial cross-sectional area of the first-end portion 153a may be located between 0° on the first-end side S1 to approximately 120° from the first-end side S1. In another embodiment, the radial cross-sectional area of the first-end portion 153a may be located between 0° on the first-end side S1 to approximately 105° from the first-end side S1. In another embodiment, the radial cross-sectional area of the first-end portion 153a may be located between 0° on the first-end side S1 to approximately 90° from the first-end side S1. In another embodiment, the radial cross-sectional area of the first-end portion 153a may be located between 0° on the first-end side S1 to approximately 75° from the first-end side S1. In another embodiment, the radial cross-sectional area of the first-end portion 153a may be located between 0° on the first-end side S1 to approximately 60° from the first-end side S1. In another embodiment, the radial cross-sectional area of the first-end portion 153a may be located between 0° on the first-end side S1 to approximately 45° from the first-end side S1. In another embodiment, the radial cross-sectional area of the first-end portion 153a may be located between 0° on the first-end side S1 to approximately 30° from the first-end side S1. The first-end portion 153a may be configured to extend across any of the above defined ranges.

According to one embodiment, the radial cross-sectional area of the second-end portion 153b may be located between the second bottom surface 150b of the clamping mechanism 150 near the 0° point on the second-end side S2 and any of the above defined ranges with respect to the first-end portion 153a. The transition point between the first-end portion 153a and the second-end portion 153b may be located between approximately 30° from the first-end side S1 to approximately 30° from the second-end side S2. The flexible section 156 of the first-end portion 153a may be located along any portion of the ranges defined above with respect to the first-end portion 153a.

In a preferred embodiment, the flexible section 156 is located in an upper range of the first-end portion 153a and the tab 155 is located in a lower range of the first-end portion 153a. For example, according to one embodiment, the tab 155 may be located from approximately 0° from the first-end side S1 to approximately 10° from the first-end side S1 and the flexible section 156 may be located between approximately 10° from the first-end side S1 to approximately 90° from the first-end side S1. In another embodiment, the tab 155 may be located from approximately 0° from the first-end side S1 to approximately 20° from the first-end side S1 and the flexible section 156 may be located between approximately 20° from the first-end side S1 to approximately 90° from the first-end side S1. In another embodiment, the tab 155 may be located from approximately 0° from the first-end side S1 to approximately 30° from the first-end side S1 and the flexible section 156 may be located between approximately 30° from the first-end side S1 to approximately 90° from the first-end side S1.

However, it is to be understood that the present disclosure is not limited to the exemplary reference points depicted in FIG. 9D. For example, in an alternate embodiment, an intermediate portion of uniform thickness may be interposed between the first-end portion 153a including the flexible section 156 and the second-end portion 153b. In another alternate embodiment, the flexible section 156 may be wholly contained within the first-end portion 153a such that another section of the first-end portion 153a, thicker than the flexible section 156, may be disposed between the flexible section 156 and the second-end portion 153b.

Referring back to FIG. 3, the first-end portion 153a is configured to have a first bend allowance and the second-end portion 153b is configured to have a second bend allowance, the first bend allowance being greater than the second bend allowance. According to one embodiment, the first bend allowance of the first-end portion 153a is determined at the flexible section 156. Thus, the second bend allowance of the second-end portion 153b is less than the first bend allowance of the first-end portion 153a at the flexible section 156. Thus, the flexible section 156 of the first-end portion 153a is configured to elongate due to the first bend allowance at the flexible section 156, and the clamping mechanism 150 is configured to bend around the ball mount assembly 200. As the second clamping force between the second-end portion 153b and the mounting base 130 is increased, the flexible section 156 of the first-end portion 153a is configured to be in a state of tension such that the ball mount 220 is securely clamped by the bent clamping mechanism 150.

Bend allowance relates to the amount of bending that may occur due to the compressive force applied via the fastener in the second through hole axis Y2 of the clamping mechanism 150 used to clamp the ball mount 220 between the mounting base 130 and the clamping mechanism 150. Thus, the flexible section 156 of the first-end portion 153a begins to bend at a lower compressive force applied via the fastener in the second through hole axis Y2 than the second-end portion 153b. The bend allowance of the first-end portion 153a and the second-end portion 153b are dependent upon the shape, material, and cross-sectional area of each respective portion.

Figure 17:
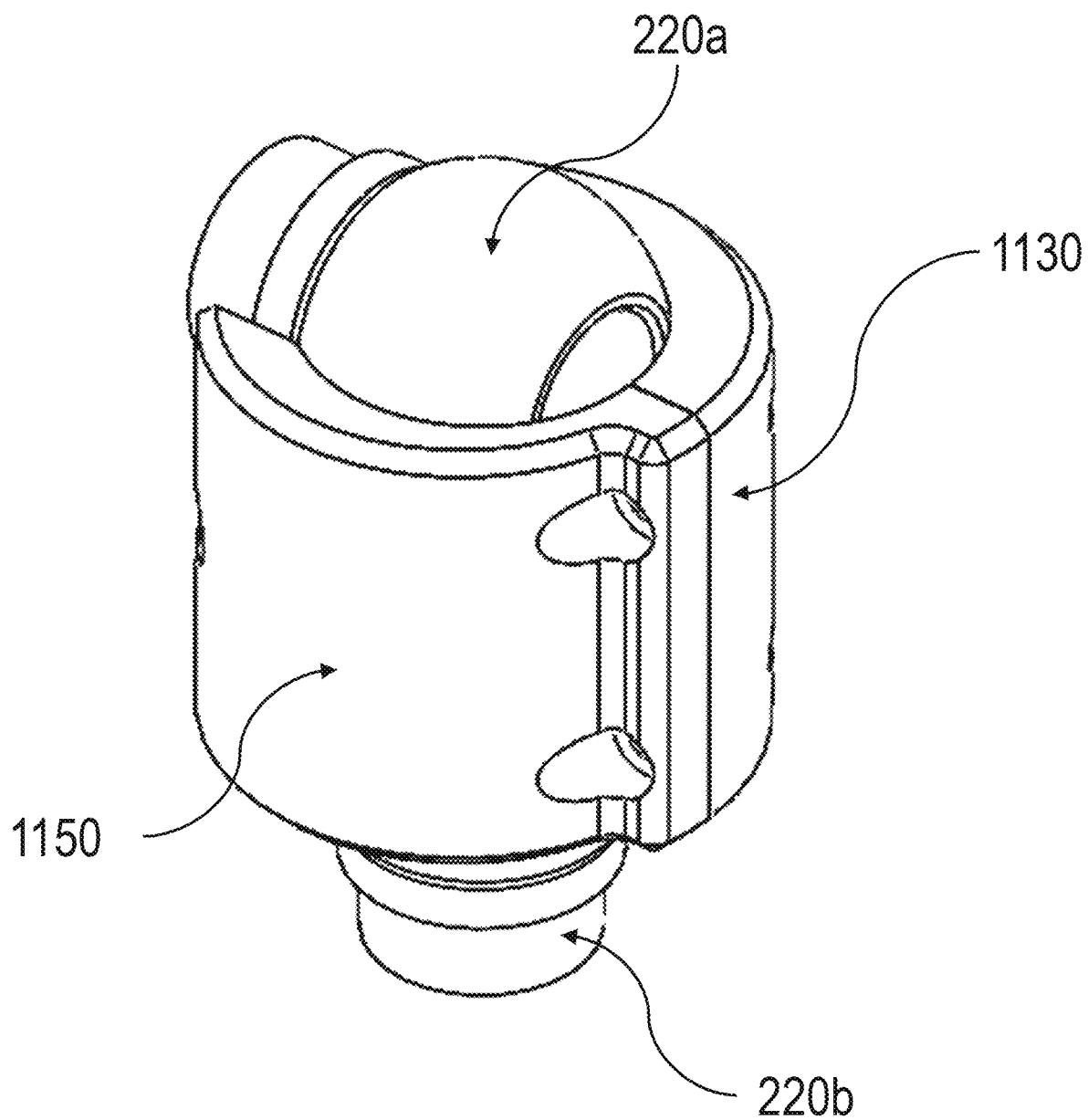
FIG. 17 is a perspective view of a mounted ball mount assembly, according to an exemplary embodiment.
Figure 18:
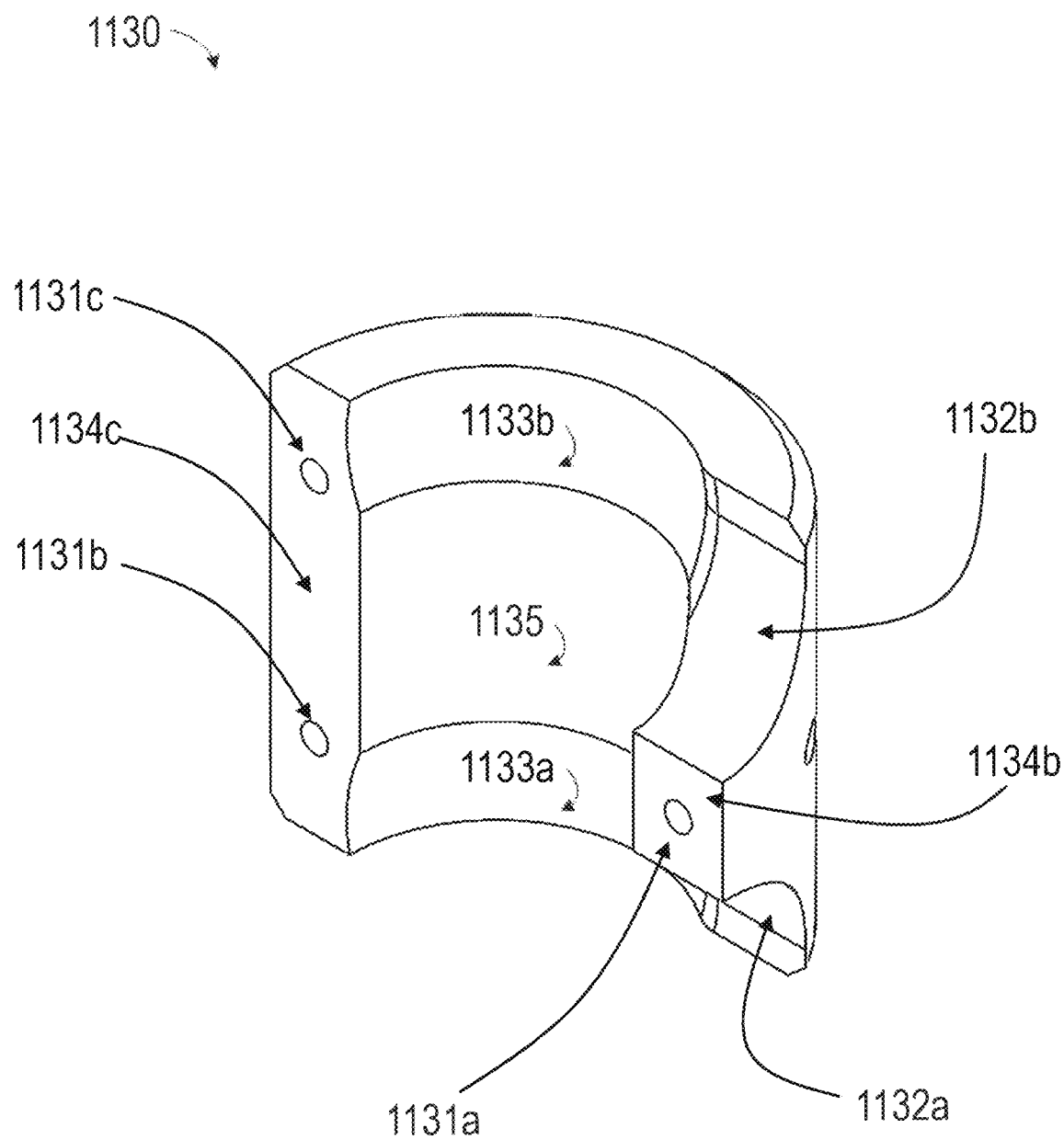
FIG. 18 is a perspective view of a mounting base, according to an exemplary embodiment.

FIG. 17 is a perspective view of a mounted ball mount assembly, according to an exemplary embodiment. FIG. 18 is a perspective view of a mounting base, according to the FIG. 17 exemplary embodiment. FIG. 19 is a perspective view of a clamping mechanism, according to the FIG. 17 exemplary embodiment. FIG. 17 illustrates a mounting base 1130 and clamping mechanism 1150 which are similar to those described above except that this embodiment accommodates two ball mounts 220a and 220b in one unified assembly (that is, in one fitting comprising two halves that are fastened together). This provides additional ranges of motion and degrees of freedom in a compact space. In this embodiment, the assembly includes cut-outs (described below) that increase the range of motion of the ball mounts. For example, in FIG. 17 the cut-outs allow the ball mount 220a to be pivoted 90 degrees with respect to a longitudinal axis (up and down in FIG. 17) of the assembly.

FIG. 18 illustrates a mounting base 1130 comprising two mounting base contoured surfaces 1133a and 1133b, each surface configured to accommodate its own ball mount. The surfaces are connected by a body portion 1135. First, second, and third mounting base through holes 1131a, 1131b, and 1131c are provided, with the first through hole being provided in a surface 1134b, and the second and third through holes provided in a surface 1134c. FIG. 18 also shows two cut-outs 1132a and 1132b which, together with cut-outs 1154a and 1154b described below, increase the range of motion of the ball mounts by providing cut-outs to avoid interference between the ball mounts and the mounting base and clamping mechanism.

Figure 19A:
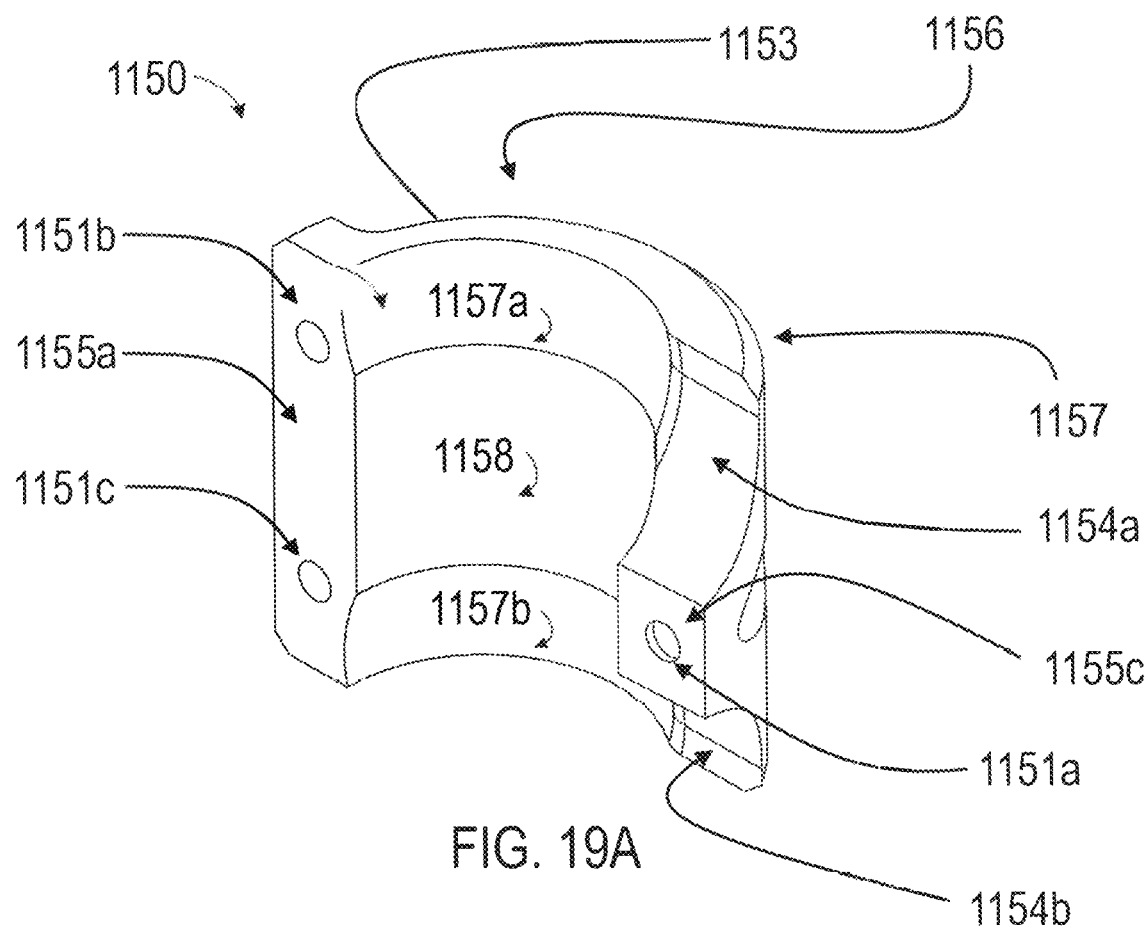
FIGS. 19A and 19B are perspective views of a clamping mechanism, according to an exemplary embodiment.
Figure 19B:
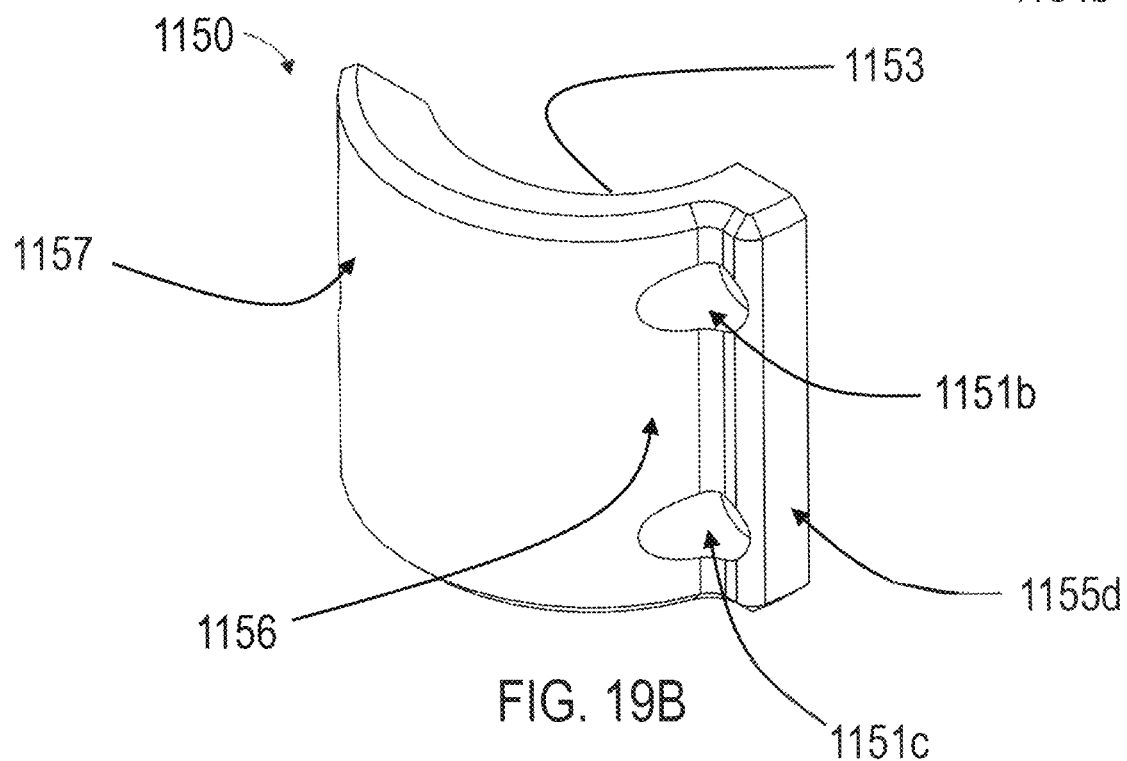

FIGS. 19A and 19B illustrate a clamping mechanism 1150 having first and second contoured surfaces 1157a and 1157b, each configured to accommodate a ball mount, and separated by a body portion 1158. The mechanism 1150 has a tab 1155d, a first-end portion 1153, and second-end portion 1157. The first-end portion 1153 has a flexible section 1156 that is similar to the design and function of the flexible sections discussed above. A first through hole 1151a passes through a surface 1155c, and second and third through holes 1151b 1151c pass through a surface 1155a.

As described above, cut-outs 1154a and 1154b, together with cut-outs 1132a and 1132b, increase the range of motion of the ball mounts by providing cut-outs to avoid interference between the ball mounts and the mounting base and clamping mechanism.

Figure 20:
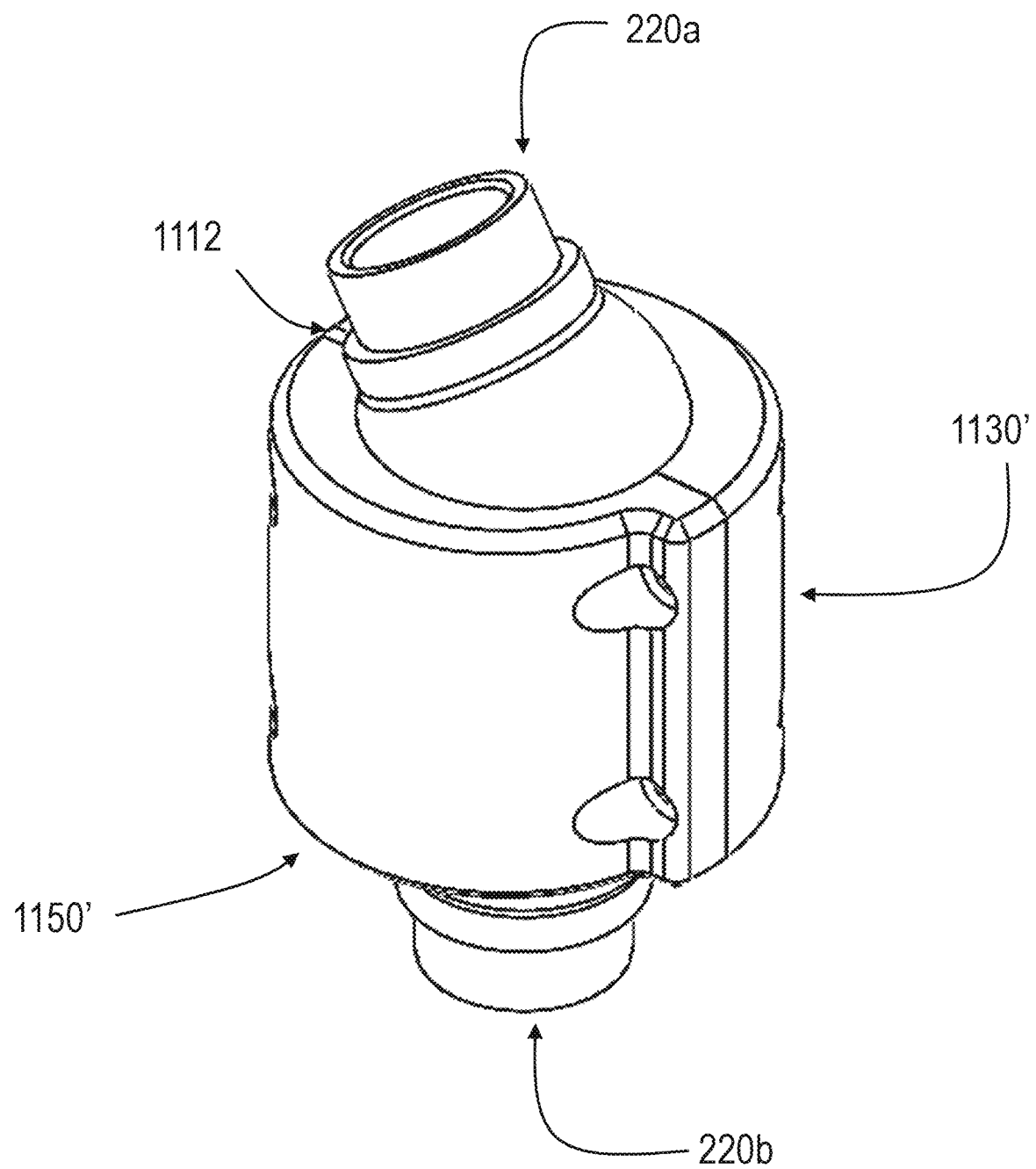
FIG. 20 is a perspective view of a mounted ball mount assembly, according to another exemplary embodiment.

FIG. 20 is a perspective view of a mounted ball mount assembly, according to another exemplary embodiment. This embodiment includes a mounting base 1130' and clamping mechanism 1150', joined together by four fasteners (not shown), and is similar to the embodiment of FIGS. 17-19, except that cut-outs are not provided. Both of these embodiments provide an arrangement which consists essentially of two members (a mounting base and a clamping mechanism) and fasteners and that can accommodate two ball mounts within one unitary fitting. FIG. 20 illustrates that one end (right side in FIG. 20) of the mounting base 1130' is in direct contact with one end of the clamping mechanism 1150' and a gap 1112 is formed between another end (left side in FIG. 20) of the mounting base and another end of the clamping mechanism when the mounting base is secured to the clamping mechanism by fasteners.

FIGS. 21A-22C relate to weight test results of a conventional clamping mechanism in a horizontal orientation and a vertical orientation and weight test results of the clamping mechanism 150, as depicted in FIG. 8A, in a horizontal orientation and a vertical orientation.

In the weight tests conducted on the clamping mechanism 150, the horizontal orientation and the vertical orientation are defined by the orientation of the mating interface 111 formed between the mounting base 130 and the clamping mechanism 150. In the conventional clamping mechanism, a mating interface is not formed on either side of the conventional clamping mechanism. Rather, two gaps are formed between the conventional clamping mechanism and the mounting base 130. As such, in the weight tests conducted on the conventional clamping mechanism, the horizontal orientation and the vertical orientation of the conventional clamping mechanism correspond to the direction in which the surfaces defining the gaps formed between the conventional clamping mechanism and the mounting base 130 extend.

The line graphs generated from the weight tests contain "Fail Point (lb)" data in the X-axis and "Torque Setting (in•lb)" data in the Y-Axis. The data corresponding to the "Fail Point (lb)" represents the point at which a ball mount assembly 200, supported by a clamp and a base in a fixed configuration, is caused to slip when an external load is applied to an enclosure 400 attached to the ball mount assembly 200. The data corresponding to the "Torque Setting (in•lb)" represents the torque applied by a torque wrench to fasteners in the conventional clamping mechanism or the clamping mechanism 150.

In the tests conducted with respect to the conventional clamping mechanism, the Torque Setting corresponds to the torque applied to each of the fasteners (e.g., Comparative Example 1: a torque of 90 in•lb is applied to each fastener; the fail point is 55 lb.). In the tests conducted with respect to the clamping mechanism 150, a fastener disposed in the second through hole 151b of the clamping mechanism 150 is adjusted based on the Torque Setting, and the other fastener disposed in the first through hole 151a is fixed at a constant torque of 80 inch-pounds (e.g., Example 1: a torque of 90 in•lb is applied to the fastener in the second through hole 151b and a torque of 80 in•lb is applied to the fastener in the first through hole 151a; the fail point is 65 lb.).

The weight tests were conducted by first fixing the ball mount assembly 200, having the enclosure 400 attached thereto, between the respective clamps and mounts in either the horizontal orientation or the vertical orientation. The clamps and mounts were fastened to each other at specified Torque Settings, as defined above, using an inch-pound torque wrench. Next, a crane scale mechanism having a first end and a second end is attached to the end of the enclosure 400 at the first end and fixed to the ground at the second end. The crane scale mechanism is configured to measure a downward force (weight) applied to the enclosure 400. A series of incremental downward force tests were then applied to the enclosure 400 to determine the point at which the ball mount assembly 200 slips out of the initial fixed position due to the force applied to the enclosure 400. The Fail Point corresponding to the Torque Setting in each of the weight tests discussed below were recorded at the moment the ball mount assembly 200 slipped out of the initial fixed position.

Figure 21A:
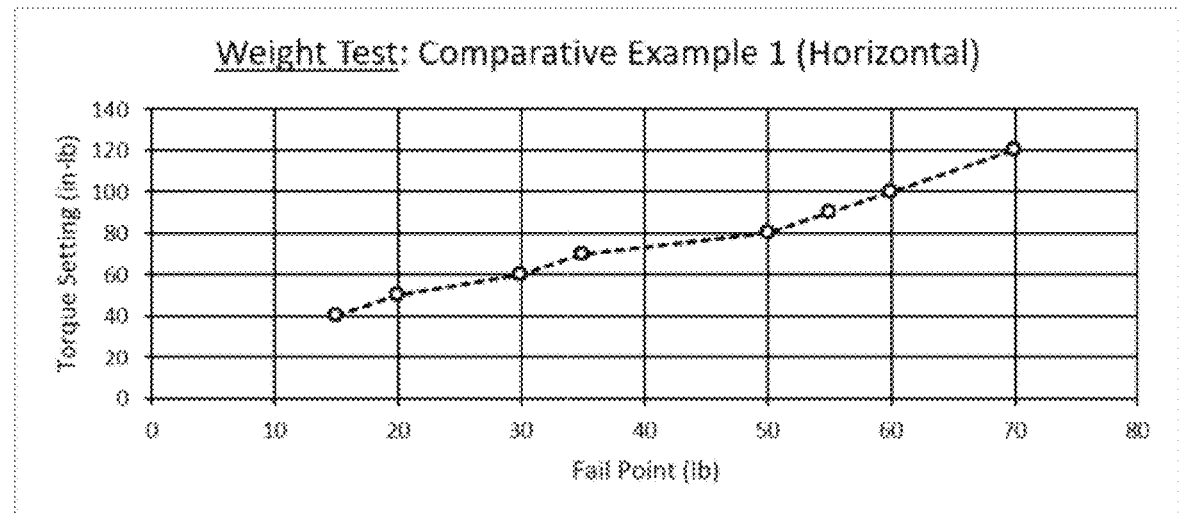
FIG. 21A is a line graph corresponding to a weight test of a conventional clamping mechanism in a horizontal orientation, the line graph illustrating a torque setting verses a fail point of the conventional clamping mechanism.
Figure 21B:
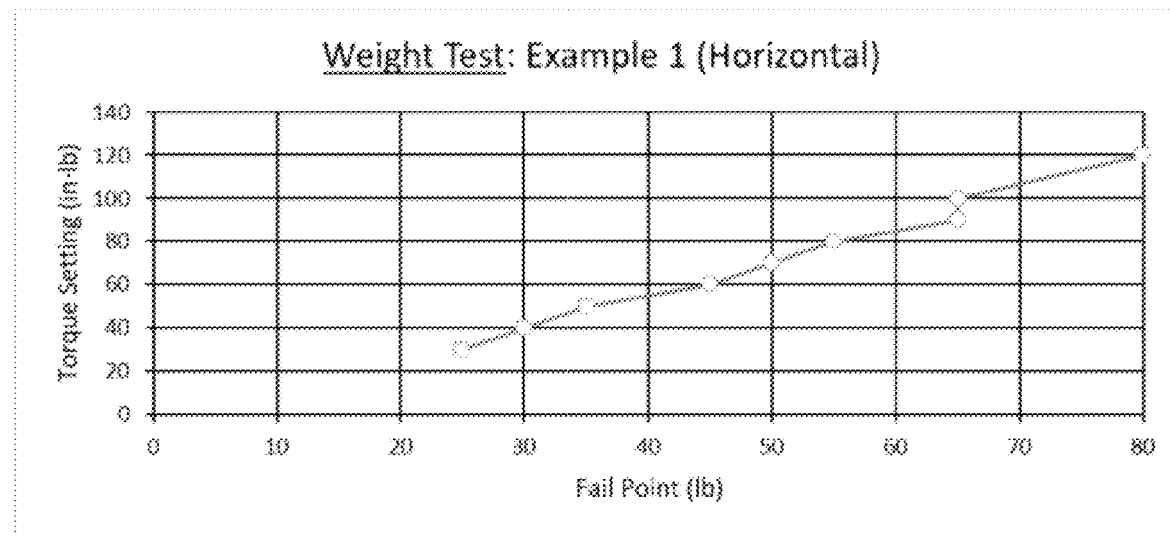
FIG. 21B is a line graph corresponding to a weight test of the clamping mechanism shown in FIG. 8A in a horizontal orientation, the line graph illustrating a torque setting verses a fail point of the clamping mechanism.

FIGS. 21A-21B are line graphs corresponding to the weight test of the conventional clamping mechanism and the weight test of the clamping mechanism 150 in horizontal orientations. Specifically, FIG. 21A illustrates Comparative Example 1 in which the conventional clamping mechanism is positioned in the horizontal orientation and FIG. 21B illustrates Example 1 in which the clamping mechanism 150 is positioned in the horizontal orientation. The test data corresponding to Comparative Example 1 is illustrated below in TABLE 1 and the test data corresponding to Example 1 is illustrated below in TABLE 2.

TABLE 1

| Comparative Example 1 | |
|---|---|
| Torque Setting (in · lb) | Fail Point (lb) |
| 40 | 15 |
| 50 | 20 |
| 60 | 30 |
| 70 | 35 |
| 80 | 50 |
| 90 | 55 |

TABLE 1-continued

| Comparative Example 1 | |
|---|---|
| Torque Setting (in · lb) | Fail Point (lb) |
| 100 | 60 |
| 120 | 70 |

TABLE 2

| Example 1 | |
|---|---|
| Torque Setting (in · lb) | Fail Point (lb) |
| 30 | 25 |
| 40 | 30 |
| 50 | 35 |
| 60 | 45 |
| 70 | 50 |
| 80 | 55 |
| 90 | 65 |
| 100 | 65 |
| 120 | 80 |

When comparing the weight test results obtained from Comparative Example 1 related to the conventional clamping mechanism in the horizontal orientation to the weight test results obtained from Example 1 related to the clamping mechanism 150 in the horizontal orientation, it is evident that a greater amount of external force is able to be applied to the clamping mechanism 150 than the conventional clamping mechanism at each torque setting before the ball mount assembly 200 begins to slip. In other words, the clamping mechanism 150 is able to support a greater external load than the conventional clamping mechanism at each Torque Setting in the horizontal orientation.

Accordingly, the clamping mechanism 150, having the flexible section 156 configured to bend toward the mounting base 130 and/or the ball mount assembly 200, due to the high bend allowance and high elasticity, generates a greater frictional output force on the ball mount assembly 200 than the conventional clamping mechanism. The frictional output force corresponds to the force that is applied between the clamp and bracket assembly and the ball mount assembly 200.

Figure 22A:
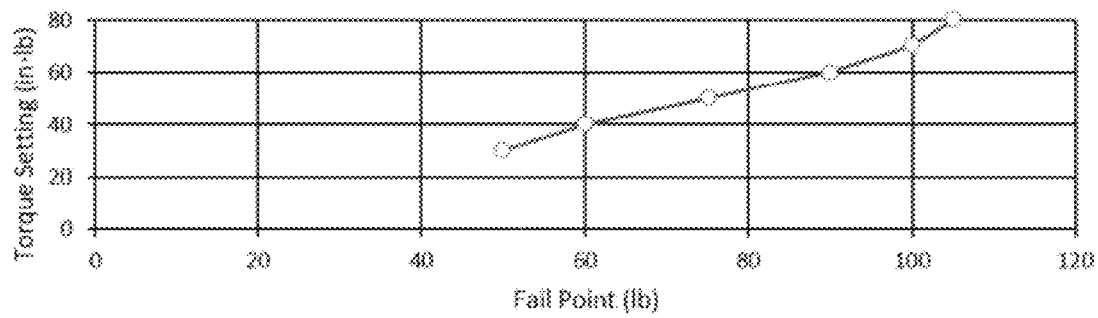
FIG. 22A is a line graph corresponding to a weight test of the conventional clamping mechanism in a vertical orientation, the line graph illustrating a torque setting verses a fail point of the conventional clamping mechanism.
Figure 22B:
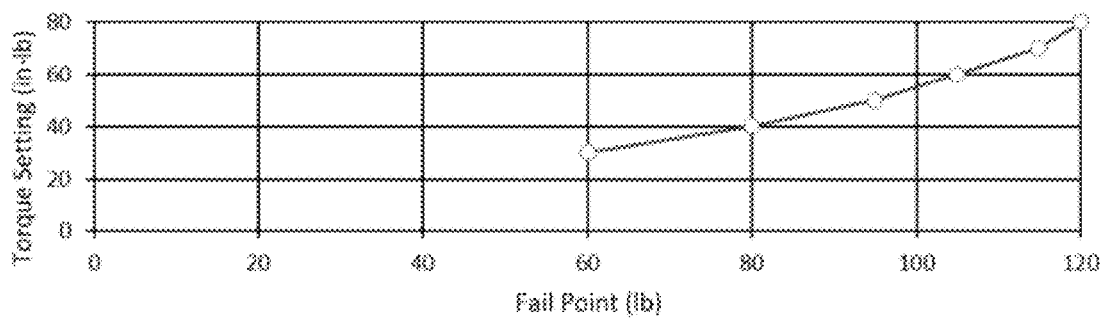
FIG. 22B is a line graph corresponding to a weight test of the clamping mechanism shown in FIG. 8A in a first vertical orientation, the line graph illustrating a torque setting verses a fail point of the clamping mechanism.
Figure 22C:
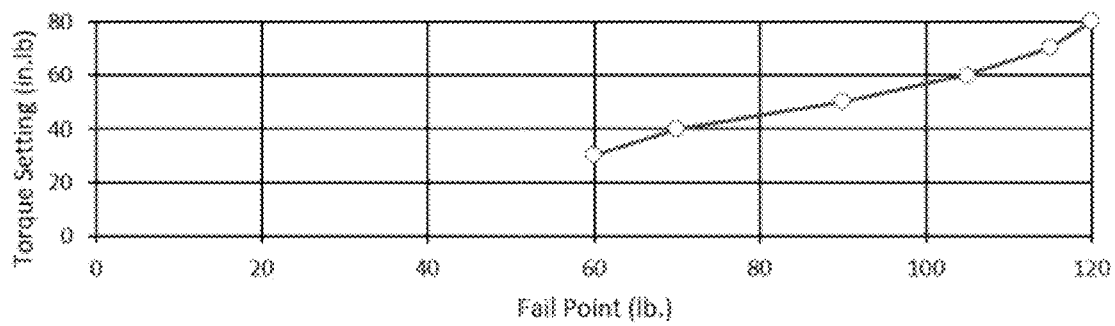
FIG. 22C is a line graph corresponding to a weight test of the clamping mechanism shown in FIG. 8A in a second vertical orientation, the line graph illustrating a torque setting verses a fail point of the clamping mechanism.

FIGS. 22A-22C are line graphs corresponding to the weight test of the conventional clamping mechanism and the weight test of the clamping mechanism 150 in vertical orientations. Specifically, FIG. 22A illustrates Comparative Example 2 in which the conventional clamping mechanism is positioned in the vertical orientation; FIG. 22B illustrates Example 2A in which the clamping mechanism 150 is positioned in the vertical orientation with the tab 155 in an upward position ("first vertical orientation"); and FIG. 22C illustrates Example 2B in which the clamping mechanism 150 is positioned in the vertical orientation with the tab 155 in a downward position ("second vertical orientation"). When the clamping mechanism 150 is oriented in the first vertical orientation the tab 155 is oriented opposite the direction in which the downward force (weight) is applied to the enclosure 400. When the clamping mechanism 150 is oriented in the second vertical orientation the tab 155 is oriented in the direction in which the downward force (weight) is applied to the enclosure 400. The test data corresponding to Comparative Example 2 is illustrated below in TABLE 3; the test data corresponding to Example 2A is illustrated below in TABLE 4; and the test data corresponding to Example 2B is illustrated below in TABLE 5.

TABLE 3

Comparative Example 2

| Torque Setting (in · lb) | Fail Point (lb) |
| --- | --- |
| 30 | 50 |
| 40 | 60 |
| 50 | 75 |
| 60 | 90 |
| 70 | 100 |
| 80 | 105 |

TABLE 4

Example 2A

| Torque Setting (in · lb) | Fail Point (lb) |
| --- | --- |
| 30 | 60 |
| 40 | 80 |
| 50 | 95 |
| 60 | 105 |
| 70 | 115 |
| 80 | 120 |

TABLE 5

Example 2B

| Torque Setting (in · lb) | Fail Point (lb) |
| --- | --- |
| 30 | 60 |
| 40 | 70 |
| 50 | 90 |
| 60 | 105 |
| 70 | 115 |
| 80 | 120 |

When comparing the weight test results obtained from Comparative Example 2 related to the conventional clamping mechanism in the vertical orientation to the weight test results obtained from Examples 2A and 2B related to the clamping mechanism 150 in the vertical orientation, it is evident that a greater amount of external force is able to be applied to the clamping mechanism 150 than to the conventional clamping mechanism at each torque setting before the ball mount assembly 200 is caused to slip. In other words, the clamping mechanism 150 is able to support a greater external load than the conventional clamping mechanism at each Torque Setting in the vertical orientation. Accordingly, the clamping mechanism 150 in the first and second vertical orientations generate a greater frictional output force on the ball mount assembly 200 than the conventional clamping mechanism in the vertical configuration.

When comparing the weight test results obtained from Example 2A related to the clamping mechanism 150 in the first vertical orientation to the weight test results obtained from Example 2B related to the clamping mechanism 150 in the second vertical orientation, it is evident that a greater amount of external force is able to be applied to the clamping mechanism 150 with the tab 155 in the upward position than the clamping mechanism 150 with the tab 155 in the downward position at certain Torque Settings. For example, when the Torque Setting is set to 50 in•lb in Example 2A, the Fail Point is 95 lb. On the other hand, when the Torque Setting is set to 50 in•lb in Example 2B, the Fail Point is 90 lb. Accordingly, the clamping mechanism 150 in the first vertical orientation generates a greater frictional output force on the ball mount assembly 200 than the clamping mechanism 150 in the second vertical orientation at certain Torque Settings.

Method for Using the Mounted Ball Mount Assembly

Methods of using and adjusting the mounted ball mount assembly 1A, the bracket assembly 100, and/or the clamping mechanism 150, as described above, are within the scope of the invention. For example, a method for adjustably clamping the ball mount 220 to the mounting base 130 and the clamping mechanism 150 may, in an exemplary embodiment, be performed using the mounted ball mount assembly 1A having the bracket assembly 100 described above. The method will be described in the context of the mounted ball mount assembly 1A having the clamping mechanism 150; however, the method of the present invention is not so limited.

The following describes a method for adjustably clamping a ball mount 220 to a mounting base 130 according to an embodiment of the present invention. The method comprises providing the mounting base 130 comprising the mounting base contoured surface 132, the first surface 130a having a first mounting base through hole 131a, and a second surface 130b having the second mounting base through hole 131b. The mounting base 130 can be the same type as described above. The method further comprises providing the clamping mechanism 150 comprising the first-end portion 153a, the second-end portion 153b, and the contoured surface 152 configured to cradle the body portion 221 of the ball mount 220. The first-end portion 153a includes the tab 155, the flexible section 156, the first bottom surface 150a that extends in a first plane, and the first through hole 151a extending through the first bottom surface 150a. The second-end portion 153b includes the second bottom surface 150b that extends in a second plane and the second through hole 151b extending through the second bottom surface 150b. The clamping mechanism 150 can be the same type as described above.

The method further comprises providing the ball mount 220 between the contoured surface 152 of the clamping mechanism 150 and the mounting base contoured surface 132 of the mounting base 130 such that the first through hole 151a and the second through hole 151b of the clamping mechanism 150 align with the first mounting base through hole 131a and the second mounting base through hole 131b, respectively. The ball mount 220 can be the same type as described above. The method further comprises securing the ball mount 220 in an adjustable position between the clamping mechanism 150 and the mounting base 130 such that the first surface 130a of the mounting base 130 contacts the first bottom surface 150a of the clamping mechanism at a mating interface 111, and the second surface 130b of the mounting base 130 is separated from the second bottom surface 150b of the clamping mechanism 150 by the gap 112.

The method for clamping the ball mount 220 to the mounting base 130 in a fixed position comprises fully fastening the second surface 130b of the mounting base 130 to the second bottom surface 150b of the clamping mechanism 150 such that the flexible section 156 of the clamping mechanism 150 is configured to elongate due to the first bend allowance at the flexible section 156. The flexible section 156 is configured to elongate when the first-end portion 153a is in a state of tension thereby causing the clamping mechanism 150 to be bent around the ball mount assembly 220. When the clamping mechanism 150 is fully fastened at the first-end portion 153a and the second-end portion 153b, causing the flexible section 156 of the clamping mechanism 150 to be in a state of tension, the gap 112 become smaller, but remains, between the second surface 130b of the mounting base 130 and the second bottom surface 150b of the clamping mechanism 150.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. References herein to the positions of elements (e.g., "top," "bottom," "above," "below") are merely used to describe the orientation of various elements in the FIGURES, and it should be noted that the orientation of various elements may differ. Accordingly, these terms should be interpreted as indicating that insubstantial or inconsequential modifications or alterations of the subject matter described and claimed are considered to be within the scope of the disclosure as recited in the appended claims.

It should be noted that the term "exemplary," "preferred," and variations thereof, as used herein to describe various embodiments, are intended to indicate that such embodiments are possible examples, representations, or illustrations of possible embodiments (and such terms are not intended to connote that such embodiments are necessarily extraordinary or superlative examples). Moreover, the claims hereof are not to be read restrictively unless there is clear and convincing evidence manifesting a certain exclusion, restriction, or disclaimer.

The terms "coupled," "connected," "attached," and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The construction and arrangement of the apparatuses and methods as shown in the various exemplary embodiments are illustrative only. It is important to note that any element disclosed in one embodiment may be incorporated or utilized with any other embodiment disclosed herein. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the patent disclosure.

What is claimed is:

1. A clamping mechanism configured to be attachable to a mounting base and to support a ball mount between the clamping mechanism and the mounting base, the clamping mechanism comprising:
    a first-end portion configured to be attached to the mounting base, the first-end portion including:
        a tab having a first bottom surface that extends in a first plane,
        a flexible section, and
        a first through hole extending through the tab and the first bottom surface;
    a second-end portion including:
        a second bottom surface that extends in a second plane, and
        a second through hole extending through the second bottom surface; and
    a curved portion extending from the flexible section of the first-end portion to the second-end portion; wherein:
    the clamping mechanism has a contoured surface configured to cradle a body portion of the ball mount;
    in a front view of the clamping mechanism, the contoured surface extends in a continuous concave curve from the first bottom surface to the second bottom surface;
    in a cross-sectional view of the clamping mechanism, perpendicular to the front view, the contoured surface is concavely curved between a front edge of the contoured surface and a rear edge of the contoured surface; and
    a radial cross-sectional area of the flexible section is smaller than a radial cross-sectional area of the second-end portion.

2. The clamping mechanism of claim 1, wherein the first plane is substantially parallel to, and offset from, the second plane.

3. The clamping mechanism of claim 2, wherein the first plane is substantially parallel to, and offset from, the second plane such that, when the first bottom surface contacts the mounting base to support the ball mount, a gap remains between the second bottom surface and the mounting base.

4. The clamping mechanism of claim 1, wherein the flexible section is disposed between the tab and the second-end portion.

5. The clamping mechanism of claim 4, wherein the contoured surface includes
    a first edge disposed on the first-end portion between the first bottom surface and the contoured surface,
    a second edge disposed on the second-end portion between the second bottom surface and the contoured surface, and
    a third edge extending from the first edge to the second edge.

6. The clamping mechanism of claim 5, wherein the radial cross-sectional area of the flexible section and the radial cross-sectional area of the second-end portion are respectively located in intersecting planes which intersect along a center axis of the contoured surface which extends through a center point of an arc defined by the third edge of the contoured surface.

7. The clamping mechanism of claim 6, wherein the center axis of the contoured surface is a center axis of the ball mount.

8. The clamping mechanism of claim 4, wherein the first plane is substantially parallel to, and offset from, the second plane.

9. The clamping mechanism of claim 1, wherein the second-end portion is configured such that the bend allowance of the second-end portion is less than a bend allowance of the flexible section.

10. A method for adjustably clamping a ball mount to a mounting base, the method comprising:
   providing a mounting base comprising
      a mounting base contoured surface,
      a first surface having a first mounting base hole, and
      a second surface having a second mounting base hole;
   providing a clamping mechanism comprising
      a first-end portion including
         a tab having a first bottom surface that extends in a first plane,
         a flexible section, and
         a first through hole extending through the first bottom surface,
      a second-end portion including
         a second bottom surface that extends in a second plane,
         a second through hole extending through the second bottom surface, and
      a curved portion extending from the flexible section of the first-end portion to the second-end portion;
   wherein:
      the clamping mechanism has a contoured surface configured to cradle a body portion of the ball mount;
      in a front view of the clamping mechanism, the contoured surface extends in a continuous concave curve from the first bottom surface to the second bottom surface;
      in a cross-sectional view of the clamping mechanism, perpendicular to the front view, the contoured surface is concavely curved between a front edge of the contoured surface and a rear edge of the contoured surface; and
      a radial cross-sectional area of the flexible section is smaller than a radial cross-sectional area of the second-end portion,
   providing the ball mount between the contoured surface of the clamping mechanism and the mounting base contoured surface such that the first through hole and the second through hole of the clamping mechanism align with the first mounting base hole and the second mounting base hole respectively; and
   securing the ball mount between the clamping mechanism and the mounting base such that
      the first surface of the mounting base contacts the first bottom surface of the clamping mechanism, and
      the second surface of the mounting base is separated from the second bottom surface of the clamping mechanism by a gap.

* * * * *